US009307297B2

(12) United States Patent
Richman et al.

(10) Patent No.: US 9,307,297 B2
(45) Date of Patent: Apr. 5, 2016

(54) SYSTEM AND METHOD FOR PROVIDING MULTI-MODE WIRELESS DATA DISTRIBUTION

(71) Applicant: Panasonic Avionics Corporation, Lake Forest, CA (US)

(72) Inventors: Russell Mark Richman, Irvine, CA (US); Hasse Sinivaara, Mission Viejo, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 74 days.

(21) Appl. No.: 14/185,615

(22) Filed: Feb. 20, 2014

(65) Prior Publication Data
US 2014/0282747 A1    Sep. 18, 2014

Related U.S. Application Data

(60) Provisional application No. 61/800,706, filed on Mar. 15, 2013.

(51) Int. Cl.
H04N 21/647    (2011.01)
H04W 76/02    (2009.01)
(Continued)

(52) U.S. Cl.
CPC ..... *H04N 21/64738* (2013.01); *H04N 21/2146* (2013.01); *H04N 21/6181* (2013.01); *H04N 21/6193* (2013.01); *H04W 76/026* (2013.01); *H04W 8/082* (2013.01)

(58) Field of Classification Search
USPC .......................... 725/62–63, 75–76
See application file for complete search history.

(56) References Cited

U.S. PATENT DOCUMENTS 3,037,812 A    6/1962 Monroe
3,717,809 A    2/1973 Laukien
(Continued)

FOREIGN PATENT DOCUMENTS

CN          1104160 A    6/1995
CN    ZL200520103236.4    12/2006
(Continued)

OTHER PUBLICATIONS

First Report, AU Appln. No. 2004251667, Sep. 26, 2008.
(Continued)

*Primary Examiner* — Mulugeta Mengesha
(74) *Attorney, Agent, or Firm* — Brian Furrer

(57) ABSTRACT

A distribution system for vehicle information systems and methods for manufacturing and using the same. The distribution system supports both Wi-Fi- and cellular-based wireless networks for the distribution of selected content to a plurality of handheld devices disposed throughout a passenger vehicle via a bypass system (e.g., a Local Internet Protocol Access (LIPA) and Selected Internet Protocol Traffic Offload (SIPTO) bypass system). In an alternative embodiment, the distribution system can be configured for distribution of the selected content from a terrestrial content system to a plurality of passenger vehicles via the bypass system. By dynamically balancing network traffic across the multiple wireless networks, the distribution system can alleviate heavy traffic network and bypass a service provider's cellular core network to optimize signal bandwidth and network performance. As a result, passengers traveling aboard the vehicle can enjoy high-speed access to content with limited delay and without incurring additional charges.

22 Claims, 16 Drawing Sheets

(51) Int. Cl.
*H04N 21/214* (2011.01)
*H04N 21/61* (2011.01)
*H04W 8/08* (2009.01)

(56) References Cited

U.S. PATENT DOCUMENTS

| | | |
|---|---|---|
| 3,980,954 A | 9/1976 | Whyte |
| 4,163,387 A | 8/1979 | Schroeder |
| 4,367,488 A | 1/1983 | Leventer et al. |
| 4,584,603 A | 4/1986 | Harrison |
| 4,647,980 A | 3/1987 | Steventon et al. |
| 4,742,544 A | 5/1988 | Kupnicki et al. |
| 4,774,514 A | 9/1988 | Hildebrandt et al. |
| 4,835,604 A | 5/1989 | Kondo et al. |
| 4,866,515 A | 9/1989 | Tagawa et al. |
| 4,866,704 A | 9/1989 | Bergman |
| 4,866,732 A | 9/1989 | Carey et al. |
| 4,887,152 A | 12/1989 | Matsuzaki et al. |
| 4,890,104 A | 12/1989 | Takanabe et al. |
| 4,896,209 A | 1/1990 | Matsuzaki et al. |
| 4,897,714 A | 1/1990 | Ichise et al. |
| 4,939,527 A | 7/1990 | Lamberty et al. |
| 4,958,381 A | 9/1990 | Toyoshima |
| 4,975,696 A | 12/1990 | Salter, Jr. et al. |
| 5,005,183 A | 4/1991 | Carey et al. |
| 5,027,124 A | 6/1991 | Fitzsimmons et al. |
| 5,034,808 A | 7/1991 | Murray |
| 5,057,835 A | 10/1991 | Factor et al. |
| 5,123,015 A | 6/1992 | Brady, Jr. et al. |
| 5,136,304 A | 8/1992 | Peters |
| 5,151,896 A | 9/1992 | Bowman et al. |
| 5,177,616 A | 1/1993 | Riday |
| 5,189,671 A | 2/1993 | Cheng |
| 5,208,590 A | 5/1993 | Pitts |
| 5,237,659 A | 8/1993 | Takats |
| 5,243,652 A | 9/1993 | Teare et al. |
| 5,276,455 A | 1/1994 | Fitzsimmons et al. |
| 5,289,272 A | 2/1994 | Rabowsky et al. |
| 5,295,089 A | 3/1994 | Ambasz |
| 5,311,302 A | 5/1994 | Berry et al. |
| 5,311,515 A | 5/1994 | Henderson et al. |
| 5,325,131 A | 6/1994 | Penney |
| 5,383,178 A | 1/1995 | Unverrich |
| 5,390,326 A | 2/1995 | Shah et al. |
| 5,410,754 A | 4/1995 | Klotzbach et al. |
| 5,444,762 A | 8/1995 | Frey et al. |
| 5,463,656 A | 10/1995 | Polivka et al. |
| 5,469,363 A | 11/1995 | Saliga |
| 5,481,478 A | 1/1996 | Palmieri et al. |
| 5,493,702 A | 2/1996 | Crowley et al. |
| 5,524,272 A | 6/1996 | Podowski et al. |
| 5,543,805 A | 8/1996 | Thaniyavarn |
| 5,555,466 A | 9/1996 | Scribner et al. |
| 5,557,656 A | 9/1996 | Ray et al. |
| 5,568,484 A | 10/1996 | Margis |
| 5,572,573 A | 11/1996 | Sylvan et al. |
| 5,579,315 A | 11/1996 | Lyu et al. |
| 5,596,647 A | 1/1997 | Wakai et al. |
| 5,610,822 A | 3/1997 | Murphy |
| 5,617,331 A | 4/1997 | Wakai et al. |
| 5,631,629 A | 5/1997 | Fooks et al. |
| 5,640,002 A | 6/1997 | Ruppert et al. |
| 5,666,291 A | 9/1997 | Scott et al. |
| 5,678,171 A | 10/1997 | Toyoma et al. |
| 5,701,582 A | 12/1997 | DeBey |
| 5,706,353 A | 1/1998 | Arai et al. |
| 5,709,448 A | 1/1998 | Jennings et al. |
| 5,711,014 A | 1/1998 | Crowley et al. |
| 5,745,159 A | 4/1998 | Wax et al. |
| 5,751,248 A | 5/1998 | Thaniyavarn |
| 5,760,819 A | 6/1998 | Sklar et al. |
| 5,790,175 A | 8/1998 | Sklar et al. |
| 5,790,787 A | 8/1998 | Scott et al. |
| 5,801,751 A | 9/1998 | Sklar et al. |
| 5,808,660 A | 9/1998 | Sekine et al. |
| 5,812,751 A | 9/1998 | Ekrot et al. |
| 5,831,664 A | 11/1998 | Wharton et al. |
| 5,832,380 A | 11/1998 | Ray et al. |
| 5,835,127 A | 11/1998 | Booth et al. |
| 5,854,591 A | 12/1998 | Atkinson |
| 5,857,869 A | 1/1999 | Parcel et al. |
| 5,878,345 A | 3/1999 | Ray et al. |
| 5,878,346 A | 3/1999 | Ray et al. |
| 5,884,166 A | 3/1999 | Ray et al. |
| 5,889,268 A | 3/1999 | Swartz |
| 5,889,775 A | 3/1999 | Sawicz et al. |
| 5,929,895 A | 7/1999 | Berry et al. |
| 5,944,803 A | 8/1999 | Whitehouse |
| 5,950,129 A | 9/1999 | Schmid et al. |
| 5,953,429 A | 9/1999 | Wakai et al. |
| 5,959,596 A | 9/1999 | McCarten et al. |
| 5,960,074 A | 9/1999 | Clark |
| 5,960,343 A | 9/1999 | Ray et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,003,030 A | 12/1999 | Kenner et al. |
| 6,014,381 A | 1/2000 | Troxel et al. |
| 6,020,848 A | 2/2000 | Wallace et al. |
| 6,047,165 A | 4/2000 | Wright et al. |
| 6,078,297 A | 6/2000 | Kormanyos |
| 6,078,348 A | 6/2000 | Klosterman et al. |
| 6,108,523 A | 8/2000 | Wright et al. |
| 6,108,539 A | 8/2000 | Ray et al. |
| 6,129,274 A | 10/2000 | Suzuki |
| 6,130,727 A | 10/2000 | Toyozumi |
| 6,135,549 A | 10/2000 | Demick et al. |
| 6,137,377 A | 10/2000 | Wallace et al. |
| 6,151,497 A | 11/2000 | Yee et al. |
| 6,154,186 A | 11/2000 | Smith et al. |
| 6,160,998 A | 12/2000 | Wright et al. |
| 6,163,681 A | 12/2000 | Wright et al. |
| 6,167,238 A | 12/2000 | Wright |
| 6,173,159 B1 | 1/2001 | Wright et al. |
| 6,177,887 B1 | 1/2001 | Jerome |
| 6,181,990 B1 | 1/2001 | Grabowsky et al. |
| 6,201,797 B1 | 3/2001 | Leuca et al. |
| 6,208,307 B1 | 3/2001 | Frisco et al. |
| 6,216,065 B1 | 4/2001 | Hall et al. |
| 6,249,913 B1 | 6/2001 | Galipeau et al. |
| 6,266,664 B1 | 7/2001 | Russell-Falla et al. |
| 6,271,728 B1 | 8/2001 | Wallace et al. |
| 6,278,936 B1 | 8/2001 | Jones |
| 6,285,878 B1 | 9/2001 | Lai |
| 6,286,139 B1 | 9/2001 | Decinque |
| 6,308,045 B1 | 10/2001 | Wright et al. |
| 6,321,084 B1 | 11/2001 | Horrer |
| 6,338,045 B1 | 1/2002 | Pappas |
| 6,351,247 B1 | 2/2002 | Linstrom et al. |
| 6,356,239 B1 | 3/2002 | Carson |
| 6,370,656 B1 | 4/2002 | Olarig et al. |
| 6,377,802 B1 | 4/2002 | McKenna et al. |
| 6,390,920 B1 | 5/2002 | Infiesto et al. |
| 6,392,692 B1 | 5/2002 | Monroe |
| 6,400,315 B1 | 6/2002 | Adler et al. |
| 6,408,180 B1 | 6/2002 | McKenna et al. |
| 6,414,644 B1 | 7/2002 | Desargant et al. |
| 6,417,803 B1 | 7/2002 | de La Chapelle et al. |
| 6,424,313 B1 | 7/2002 | Navarro et al. |
| 6,445,777 B1 | 9/2002 | Clark et al. |
| 6,483,458 B1 | 11/2002 | Carson |
| 6,484,011 B1 | 11/2002 | Thompson et al. |
| 6,487,540 B1 | 11/2002 | Smith et al. |
| 6,493,744 B1 | 12/2002 | Emens et al. |
| 6,499,027 B1 | 12/2002 | Weinberger |
| 6,507,279 B2 | 1/2003 | Loof |
| 6,507,952 B1 | 1/2003 | Miller et al. |
| 6,512,511 B2 | 1/2003 | Willner et al. |
| 6,519,693 B1 | 2/2003 | Debey |
| 6,522,867 B1 | 2/2003 | Wright et al. |
| 6,529,706 B1 | 3/2003 | Mitchell |
| 6,538,656 B1 | 3/2003 | Cheung et al. |
| 6,542,086 B2 | 4/2003 | Baumgartner et al. |

(56) References Cited

U.S. PATENT DOCUMENTS

| | | |
|---|---|---|
| 6,549,754 B1 | 4/2003 | Miller et al. |
| 6,559,812 B1 | 5/2003 | McCarten et al. |
| 6,574,338 B1 | 6/2003 | Sachdev |
| 6,580,402 B2 | 6/2003 | Navarro et al. |
| 6,594,471 B1 | 7/2003 | Crowley et al. |
| 6,598,227 B1 | 7/2003 | Berry et al. |
| 6,600,418 B2 | 7/2003 | Francis et al. |
| 6,606,056 B2 | 8/2003 | Brogden |
| 6,609,103 B1 | 8/2003 | Kolls |
| 6,618,580 B2 | 9/2003 | Parrott et al. |
| 6,622,124 B1 | 9/2003 | Kolls |
| 6,628,235 B2 | 9/2003 | Wight |
| 6,636,203 B1 | 10/2003 | Wong et al. |
| 6,637,484 B1 | 10/2003 | Kraft |
| 6,643,510 B2 | 11/2003 | Taylor |
| 6,650,898 B2 | 11/2003 | Jochim et al. |
| 6,658,595 B1 | 12/2003 | Thamattoor |
| 6,659,274 B2 | 12/2003 | Enners |
| 6,661,353 B1 | 12/2003 | Gopen |
| 6,674,339 B2 | 1/2004 | Kormanyos |
| 6,674,398 B2 | 1/2004 | Murphy |
| 6,684,240 B1 | 1/2004 | Goddard |
| 6,693,236 B1 | 2/2004 | Gould et al. |
| 6,702,604 B1 | 3/2004 | Moscovitch |
| 6,703,974 B2 | 3/2004 | White et al. |
| 6,707,346 B2 | 3/2004 | Tillotson et al. |
| 6,708,019 B2 | 3/2004 | McLain et al. |
| 6,714,163 B2 | 3/2004 | Navarro et al. |
| 6,725,035 B2 | 4/2004 | Jochim et al. |
| 6,728,535 B2 | 4/2004 | Parkman |
| 6,731,909 B2 | 5/2004 | McLain et al. |
| 6,736,315 B2 | 5/2004 | Swartz |
| 6,741,141 B2 | 5/2004 | Kormanyos |
| 6,741,841 B1 | 5/2004 | Mitchell |
| 6,745,010 B2 | 6/2004 | Wright et al. |
| 6,747,960 B2 | 6/2004 | Tillotson |
| 6,748,597 B1 | 6/2004 | Frisco et al. |
| 6,757,712 B1 | 6/2004 | Bastian et al. |
| 6,769,010 B1 | 7/2004 | Knapp et al. |
| 6,771,608 B2 | 8/2004 | Tillotson |
| 6,775,545 B2 | 8/2004 | Wright et al. |
| 6,778,825 B2 | 8/2004 | Parkman |
| 6,782,392 B1 | 8/2004 | Weinberger et al. |
| 6,785,526 B2 | 8/2004 | McLain et al. |
| 6,788,935 B1 | 9/2004 | McKenna et al. |
| 6,796,495 B2 | 9/2004 | Stahl et al. |
| 6,807,148 B1 | 10/2004 | Eicher |
| 6,807,538 B1 | 10/2004 | Weinberger et al. |
| 6,810,527 B1 | 10/2004 | Conrad et al. |
| 6,811,491 B1 | 11/2004 | Levenberg et al. |
| 6,813,777 B1 | 11/2004 | Weinberger et al. |
| 6,820,221 B2 | 11/2004 | Fleming |
| 6,844,855 B2 | 1/2005 | Carson |
| 6,847,801 B2 | 1/2005 | de La Chapelle et al. |
| 6,876,905 B2 | 4/2005 | Farley et al. |
| 6,885,845 B1 | 4/2005 | Crowley et al. |
| 6,885,863 B2 | 4/2005 | Parkman et al. |
| 6,885,864 B2 | 4/2005 | McKenna et al. |
| 6,889,042 B2 | 5/2005 | Rousseau et al. |
| 6,892,052 B2 | 5/2005 | Kotola et al. |
| 6,899,390 B2 | 5/2005 | Sanfrod et al. |
| 6,920,611 B1 | 7/2005 | Spaeth et al. |
| 6,937,164 B2 | 8/2005 | Thomson et al. |
| 6,938,190 B2 | 8/2005 | Okuda |
| 6,940,978 B2 | 9/2005 | Parkman |
| 6,941,111 B2 | 9/2005 | McLain et al. |
| 6,946,990 B2 | 9/2005 | Monk |
| 6,947,726 B2 | 9/2005 | Rockwell |
| 6,947,733 B2 | 9/2005 | Tillotson |
| 6,959,168 B2 | 10/2005 | Parkman |
| 6,963,304 B2 | 11/2005 | Murphy |
| 6,963,898 B2 | 11/2005 | Yoshimine et al. |
| 6,965,851 B2 | 11/2005 | Tillotson |
| 6,970,939 B2 | 11/2005 | Sim |
| 6,971,608 B2 | 12/2005 | Harrington et al. |
| 6,974,076 B1 | 12/2005 | Siegel |
| 6,975,587 B1 | 12/2005 | Adamski et al. |
| 6,975,616 B2 | 12/2005 | Stephenson et al. |
| 6,983,312 B1 | 1/2006 | O'Neil |
| 6,985,588 B1 | 1/2006 | Glick et al. |
| 6,990,338 B2 | 1/2006 | Miller et al. |
| 6,993,288 B2 | 1/2006 | de La Chapelle et al. |
| 6,995,976 B2 | 2/2006 | Richardsom |
| 7,023,996 B2 | 4/2006 | Stephenson et al. |
| 7,036,889 B2 | 5/2006 | Sanfrod et al. |
| 7,039,827 B2 | 5/2006 | Meyer et al. |
| 7,040,698 B2 | 5/2006 | Park et al. |
| 7,054,593 B2 | 5/2006 | de La Chapelle et al. |
| 7,062,268 B2 | 6/2006 | McKenna |
| 7,068,615 B2 | 6/2006 | Niesen |
| 7,072,634 B2 | 7/2006 | Tillotson |
| 7,085,563 B2 | 8/2006 | Parkman |
| 7,086,081 B2 | 8/2006 | Martinez et al. |
| 7,099,665 B2 | 8/2006 | Taylor |
| 7,100,187 B2 | 8/2006 | Pierzga et al. |
| 7,107,062 B2 | 9/2006 | Cruz et al. |
| 7,113,780 B2 | 9/2006 | McKenna et al. |
| 7,120,389 B2 | 10/2006 | de La Chapelle et al. |
| 7,123,199 B2 | 10/2006 | Rotta |
| 7,124,426 B1 | 10/2006 | Tsuria et al. |
| 7,136,621 B2 | 11/2006 | de La Chapelle et al. |
| 7,139,258 B2 | 11/2006 | Tillotson |
| 7,155,168 B2 | 12/2006 | McLain et al. |
| 7,162,235 B1 | 1/2007 | Gilbert |
| 7,171,197 B2 | 1/2007 | Miller et al. |
| 7,177,638 B2 | 2/2007 | Funderburk et al. |
| 7,187,690 B2 | 3/2007 | Taylor |
| 7,187,927 B1 | 3/2007 | Mitchell |
| 7,233,958 B2 | 6/2007 | Weng et al. |
| 7,250,915 B2 | 7/2007 | Nelson |
| 7,269,761 B2 | 9/2007 | Yi |
| 7,274,336 B2 | 9/2007 | Carson |
| 7,280,825 B2 | 10/2007 | Keen et al. |
| 7,286,503 B1 | 10/2007 | Clarke et al. |
| 7,299,013 B2 | 11/2007 | Rotta et al. |
| 7,302,226 B2 | 11/2007 | Stephenson |
| 7,321,383 B2 | 1/2008 | Monagahn et al. |
| 7,328,012 B2 | 2/2008 | Ziarno et al. |
| 7,330,151 B1 | 2/2008 | Monk et al. |
| 7,343,157 B1 | 3/2008 | Mitchell |
| 7,359,700 B2 | 4/2008 | Swensen et al. |
| 7,359,955 B2 | 4/2008 | Menon et al. |
| 7,360,833 B2 | 4/2008 | Vitito |
| 7,362,262 B2 | 4/2008 | Murphy |
| 7,382,327 B2 | 6/2008 | Nelson |
| 7,400,858 B2 | 7/2008 | Crowley et al. |
| 7,401,676 B2 | 7/2008 | Kim |
| 7,406,309 B2 | 7/2008 | Usher et al. |
| 7,414,573 B2 | 8/2008 | Murphy |
| 7,437,125 B2 | 10/2008 | McLain et al. |
| 7,448,679 B2 | 11/2008 | Chang |
| 7,450,901 B2 | 11/2008 | Parkman |
| 7,454,202 B2 | 11/2008 | de La Chapelle |
| 7,454,203 B2 | 11/2008 | Levitan |
| 7,460,866 B2 | 12/2008 | Salkini et al. |
| 7,464,094 B2 | 12/2008 | Sullivan et al. |
| 7,483,696 B1 | 1/2009 | Mitchell |
| 7,486,927 B2 | 2/2009 | Kallio et al. |
| 7,495,895 B2 | 2/2009 | Carnevali |
| 7,496,361 B1 | 2/2009 | Mitchell et al. |
| 7,505,736 B2 | 3/2009 | Min |
| 7,508,342 B2 | 3/2009 | Nelson |
| 7,565,143 B2 | 7/2009 | Takeuchi et al. |
| 7,580,728 B2 | 8/2009 | Vance et al. |
| 7,690,012 B2 | 3/2010 | Luehrs |
| 7,724,235 B2 | 5/2010 | Paolucci et al. |
| 7,733,637 B2 | 6/2010 | Lam |
| 7,794,326 B2 | 9/2010 | Wu et al. |
| 7,833,097 B1 | 11/2010 | Maddox et al. |
| 7,904,244 B2 | 3/2011 | Sugla |
| 7,945,259 B2 | 5/2011 | Radpour |
| 7,945,937 B2 | 5/2011 | Ogawa |
| 8,081,968 B2 | 12/2011 | Lauer et al. |
| 8,160,530 B2 | 4/2012 | Corman et al. |

(56) References Cited

U.S. PATENT DOCUMENTS

| | | |
|---|---|---|
| 2002/0013150 A1 | 1/2002 | McKenna et al. |
| 2002/0026442 A1 | 2/2002 | Lipscomb et al. |
| 2002/0031643 A1 | 3/2002 | Hardgrove et al. |
| 2002/0045444 A1 | 4/2002 | User et al. |
| 2002/0045484 A1 | 4/2002 | Eck |
| 2002/0046406 A1 | 4/2002 | Chelehmal et al. |
| 2002/0059363 A1 | 5/2002 | Katz et al. |
| 2002/0059614 A1 | 5/2002 | Lipsanen et al. |
| 2002/0065711 A1 | 5/2002 | Fujisawa et al. |
| 2002/0087992 A1 | 7/2002 | Bengeult et al. |
| 2002/0093564 A1 | 7/2002 | Israel |
| 2002/0094829 A1 | 7/2002 | Ritter |
| 2002/0095680 A1 | 7/2002 | Davidson |
| 2002/0152432 A1 | 10/2002 | Fleming |
| 2002/0152446 A1 | 10/2002 | Fleming |
| 2002/0152470 A1 | 10/2002 | Hammond |
| 2002/0156646 A1 | 10/2002 | Kaiwa et al. |
| 2002/0162113 A1 | 10/2002 | Hunter |
| 2002/0170060 A1 | 11/2002 | Lyman |
| 2002/0178451 A1 | 11/2002 | Ficco |
| 2002/0184555 A1 | 12/2002 | Wong et al. |
| 2002/0197990 A1 | 12/2002 | Jochim et al. |
| 2003/0003899 A1 | 1/2003 | Tashiro et al. |
| 2003/0008652 A1 | 1/2003 | Jochim et al. |
| 2003/0020991 A1 | 1/2003 | Chang |
| 2003/0043760 A1 | 3/2003 | Taylor |
| 2003/0047647 A1 | 3/2003 | Poblete |
| 2003/0055975 A1 | 3/2003 | Nelson et al. |
| 2003/0060190 A1 | 3/2003 | Mallart |
| 2003/0069015 A1 | 4/2003 | Brinkley et al. |
| 2003/0077308 A1 | 4/2003 | Rosen |
| 2003/0084451 A1 | 5/2003 | Pierzga et al. |
| 2003/0085818 A1 | 5/2003 | Renton et al. |
| 2003/0087672 A1 | 5/2003 | Kattukaran et al. |
| 2003/0093798 A1 | 5/2003 | Rogerson |
| 2003/0095110 A1 | 5/2003 | Ukita et al. |
| 2003/0107248 A1 | 6/2003 | Sanford et al. |
| 2003/0119543 A1 | 6/2003 | Kfoury et al. |
| 2003/0130769 A1 | 7/2003 | Farley et al. |
| 2003/0140345 A1 | 7/2003 | Fisk et al. |
| 2003/0148736 A1 | 8/2003 | Wright et al. |
| 2003/0160710 A1 | 8/2003 | Baumgartner et al. |
| 2003/0160754 A1 | 8/2003 | Hanson et al. |
| 2003/0169563 A1 | 9/2003 | Adams |
| 2003/0184449 A1 | 10/2003 | Baumgartner et al. |
| 2003/0200482 A1 | 10/2003 | Sullivan |
| 2003/0217363 A1 | 11/2003 | Brady et al. |
| 2003/0233469 A1 | 12/2003 | Knowlson et al. |
| 2003/0233658 A1 | 12/2003 | Keen et al. |
| 2003/0234799 A1 | 12/2003 | Lee |
| 2004/0034816 A1 | 2/2004 | Richard |
| 2004/0049797 A1 | 3/2004 | Salmonsen |
| 2004/0077308 A1 | 4/2004 | Sanford et al. |
| 2004/0078821 A1 | 4/2004 | Frisco et al. |
| 2004/0098745 A1 | 5/2004 | Marston et al. |
| 2004/0108963 A1 | 6/2004 | Clymer et al. |
| 2004/0123322 A1 | 6/2004 | Erkocevic et al. |
| 2004/0142658 A1 | 7/2004 | McKenna et al. |
| 2004/0147243 A1 | 7/2004 | McKenna |
| 2004/0158863 A1 | 8/2004 | McLain |
| 2004/0162928 A1 | 8/2004 | Benson |
| 2004/0167967 A1 | 8/2004 | Bastian et al. |
| 2004/0183346 A1 | 9/2004 | Sanford et al. |
| 2004/0192339 A1 | 9/2004 | Wilson et al. |
| 2004/0235469 A1 | 11/2004 | Krug |
| 2004/0252965 A1 | 12/2004 | Moreno et al. |
| 2004/0252966 A1 | 12/2004 | Holloway et al. |
| 2004/0253951 A1 | 12/2004 | Chang et al. |
| 2005/0005298 A1 | 1/2005 | Tranchina |
| 2005/0026608 A1 | 2/2005 | Kallio et al. |
| 2005/0044564 A1 | 2/2005 | Stopniewicz et al. |
| 2005/0047081 A1 | 3/2005 | LaPorte et al. |
| 2005/0111182 A1 | 5/2005 | Lin et al. |
| 2005/0114894 A1 | 5/2005 | Hoerl |
| 2005/0132407 A1 | 6/2005 | Boyer et al. |
| 2005/0136917 A1 | 6/2005 | Taylor |
| 2005/0149684 A1 | 7/2005 | Sankaran et al. |
| 2005/0164148 A1 | 7/2005 | Sinclair |
| 2005/0171653 A1 | 8/2005 | Taylor |
| 2005/0176368 A1 | 8/2005 | Young et al. |
| 2005/0177763 A1 | 8/2005 | Stoler |
| 2005/0181723 A1 | 8/2005 | Miller et al. |
| 2005/0193257 A1 | 9/2005 | Stoler |
| 2005/0202785 A1 | 9/2005 | Meyer |
| 2005/0215249 A1 | 9/2005 | Little et al. |
| 2005/0216938 A1 | 9/2005 | Brady et al. |
| 2005/0239261 A1 | 10/2005 | Tai et al. |
| 2005/0239434 A1 | 10/2005 | Marlowe |
| 2005/0242636 A1 | 11/2005 | Vitito |
| 2005/0242637 A1 | 11/2005 | Vitito |
| 2005/0242638 A1 | 11/2005 | Vitito |
| 2005/0251798 A1 | 11/2005 | Fraley |
| 2005/0256616 A1 | 11/2005 | Rhoads |
| 2005/0268319 A1 | 12/2005 | Brady |
| 2005/0268320 A1 | 12/2005 | Smith |
| 2005/0270373 A1 | 12/2005 | Trela |
| 2005/0273823 A1 | 12/2005 | Brady et al. |
| 2005/0278753 A1 | 12/2005 | Brady et al. |
| 2005/0278754 A1 | 12/2005 | Bleacher et al. |
| 2006/0006287 A1 | 1/2006 | Ferguson et al. |
| 2006/0008256 A1 | 1/2006 | Khedouri et al. |
| 2006/0030311 A1 | 2/2006 | Cruz et al. |
| 2006/0032979 A1 | 2/2006 | Mitchell et al. |
| 2006/0040612 A1 | 2/2006 | Min |
| 2006/0040660 A1 | 2/2006 | Cruz et al. |
| 2006/0047426 A1 | 3/2006 | Vitito |
| 2006/0088001 A1 | 4/2006 | Reitmann et al. |
| 2006/0107295 A1 | 5/2006 | Margis et al. |
| 2006/0119151 A1 | 6/2006 | Vitito |
| 2006/0143662 A1 | 6/2006 | Easterling et al. |
| 2006/0154601 A1 | 7/2006 | Tewalt et al. |
| 2006/0174285 A1 | 8/2006 | Brady, Jr. et al. |
| 2006/0183450 A1 | 8/2006 | Cameron |
| 2006/0197750 A1 | 9/2006 | Kerr et al. |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0256090 A1 | 11/2006 | Huppi |
| 2006/0264173 A1 | 11/2006 | Gilbert |
| 2006/0270373 A1 | 11/2006 | So |
| 2006/0270470 A1 | 11/2006 | de La Chapelle et al. |
| 2006/0276127 A1 | 12/2006 | Cruz et al. |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0021117 A1 | 1/2007 | McKenna et al. |
| 2007/0022018 A1 | 1/2007 | Suryanarayana et al. |
| 2007/0026795 A1 | 2/2007 | de La Chapelle |
| 2007/0042772 A1 | 2/2007 | Salkini et al. |
| 2007/0044126 A1 | 2/2007 | Mitchell |
| 2007/0060133 A1 | 3/2007 | Spitzer et al. |
| 2007/0087756 A1 | 4/2007 | Hoffberg |
| 2007/0115621 A1 | 5/2007 | Guillen |
| 2007/0155381 A1 | 7/2007 | Alberth et al. |
| 2007/0155421 A1 | 7/2007 | Alberth et al. |
| 2007/0202802 A1 | 8/2007 | Kallio et al. |
| 2007/0213009 A1 | 9/2007 | Higashida et al. |
| 2007/0258417 A1 | 11/2007 | Harvey et al. |
| 2007/0298741 A1 | 12/2007 | Harpist et al. |
| 2008/0004016 A1 | 1/2008 | Smee et al. |
| 2008/0023600 A1 | 1/2008 | Perlman |
| 2008/0040756 A1 | 2/2008 | Perlman |
| 2008/0084882 A1 | 4/2008 | Eruchimovitch |
| 2008/0085691 A1 | 4/2008 | Harvey et al. |
| 2008/0090567 A1 | 4/2008 | Gilbert |
| 2008/0124054 A1 | 5/2008 | Bonar |
| 2008/0125112 A1 | 5/2008 | Clarke et al. |
| 2008/0127278 A1 | 5/2008 | Bonar |
| 2008/0130539 A1 | 6/2008 | Lauer et al. |
| 2008/0132212 A1 | 6/2008 | Lemond et al. |
| 2008/0133705 A1 | 6/2008 | Lemond et al. |
| 2008/0141314 A1 | 6/2008 | Lemond et al. |
| 2008/0181169 A1 | 7/2008 | Lauer et al. |
| 2008/0182573 A1 | 7/2008 | Lauer et al. |

(56) References Cited

U.S. PATENT DOCUMENTS

| | | | |
|---|---|---|---|
| 2008/0274734 | A1 | 11/2008 | Kostanic et al. |
| 2008/0299965 | A1 | 12/2008 | Lagerman |
| 2008/0305762 | A1 | 12/2008 | Malosh |
| 2008/0311765 | A1 | 12/2008 | Chatterjee et al. |
| 2009/0007193 | A1 | 1/2009 | Correa et al. |
| 2009/0010200 | A1 | 1/2009 | Lauer et al. |
| 2009/0042651 | A1 | 2/2009 | Prabhu et al. |
| 2009/0077595 | A1 | 3/2009 | Sizelove et al. |
| 2009/0081947 | A1 | 3/2009 | Margis |
| 2009/0083805 | A1 | 3/2009 | Sizelove et al. |
| 2010/0081505 | A1 | 4/2010 | Alten et al. |
| 2010/0188338 | A1 | 7/2010 | Longe |
| 2010/0189089 | A1* | 7/2010 | Lynch et al. ............... 370/338 |
| 2014/0341109 | A1* | 11/2014 | Cartmell et al. ........... 370/328 |

FOREIGN PATENT DOCUMENTS

| | | | |
|---|---|---|---|
| EP | 0 577 054 | A1 | 1/1994 |
| EP | 0 767 594 | A2 | 9/1997 |
| EP | 0 577 054 | B1 | 3/1998 |
| EP | 0 890 907 | A1 | 1/1999 |
| EP | 0 930 513 | A2 | 7/1999 |
| EP | 1 134 658 | A3 | 9/2001 |
| EP | 1 217 833 | A2 | 6/2002 |
| EP | 1 231 534 | A1 | 8/2002 |
| EP | 1 217 833 | A3 | 4/2004 |
| EP | 14155830.4-1854 | | 11/2014 |
| EP | 14155830.1-1854 | | 1/2016 |
| JP | 58-46485 | | 3/1983 |
| JP | 62-238693 | | 10/1987 |
| JP | 6111124 | | 4/1994 |
| JP | H06-285259 | A | 10/1994 |
| JP | H09-512401 | A | 11/1995 |
| JP | 2003-534959 | A | 4/2000 |
| JP | 2002-26837 | A | 1/2002 |
| JP | 2002-77084 | A | 3/2002 |
| JP | 2002-77174 | A | 3/2002 |
| JP | 2005-508098 | A | 4/2002 |
| JP | 2003-140804 | A | 5/2003 |
| JP | 2004-80447 | A | 3/2004 |
| JP | 2004-194059 | A | 7/2004 |
| JP | 2004-343744 | A | 12/2004 |
| JP | 2006-527540 | A | 1/2005 |
| JP | 2005-045490 | A | 2/2005 |
| JP | 2005-528030 | A | 9/2005 |
| WO | WO 99/14655 | A1 | 3/1999 |
| WO | WO 99/31821 | A | 6/1999 |
| WO | WO 00/14987 | A1 | 3/2000 |
| WO | WO 00/22488 | A1 | 4/2000 |
| WO | WO 02/15582 | A1 | 2/2002 |
| WO | WO 02/084971 | | 10/2002 |
| WO | WO 03/024110 | A1 | 3/2003 |
| WO | WO 03/032503 | A2 | 4/2003 |
| WO | WO 03/050000 | A1 | 6/2003 |
| WO | WO 2004/003696 | A2 | 1/2004 |
| WO | WO 2004/003696 | A3 | 1/2004 |
| WO | WO 2004/008277 | A2 | 1/2004 |
| WO | WO 2004/008277 | A3 | 1/2004 |
| WO | WO 2005/120068 | A3 | 12/2005 |
| WO | WO 2006/052941 | A1 | 5/2006 |
| WO | WO 2006/062641 | A2 | 6/2006 |
| WO | WO 2006/065381 | A2 | 6/2006 |
| WO | WO 2007/035739 | A2 | 3/2007 |
| WO | 2012/033774 | A2 | 3/2012 |
| WO | 2012/167184 | A2 | 12/2012 |

OTHER PUBLICATIONS

Office Action, CN Appln No. 200880107089.4, Mar. 7, 2013.
Office Action, CN Appln No. 200880115267.8, Dec. 24, 2014.
Office Action, CN Appln No. 200880115267.8, Jul. 8, 2013.
Office Action, CN Appln. No. 200780029616.X, Aug. 6, 2010.
Office Action, CN Appln. No. 200780029616.X, Nov. 2, 2012.
Office Action, CN Appln. No. 200780029616.X, Apr. 17, 2013.
Office Action, CN Appln. No. 200880107132.7, Jul. 22, 2011.
Office Action, CN Appln. No. 200880107132.7, Jun. 7, 2013.
Office Action, CN Appln. No. 200880107132.7, Dec. 16, 2013.
Communication, App. No. 04 754 296.4-1241, Apr. 4, 2007.
Communication, App. No. 05 749 692.9-1525, Jun. 15, 2007.
Communication, App. No. 05 749 692.9-1525, Oct. 22, 2008.
Communication, App. No. 05 762 201.1-2202, May 18, 2007.
Communication, App. No. 05 762 201.1-2202, Jul. 18, 2008.
Communication, App. No. 06 740 274.3-2416, Jan. 31, 2008.
Communication, App. No. 06 740 274.3-2416, Sep. 17, 2008.
Communication, App. No. 07 813 357.6-1523, Sep. 29, 2009.
EP Exam Report, EP Appln. No. 05 823 171.3, Feb. 6, 2013.
Notice of Intention to Grant, App. No. 06 740 274.3-2416, Mar. 20, 2009.
Office Action; EP Application No. 08 830 787.1, Dec. 9, 2011.
Final Office Action, Decision of Refusal, JP Appln. No. 2006-515179, Jul. 5, 2011.
Office Action, JP Appln. No. 2004-199893, Jul. 5, 2005.
Office Action, JP Appln. No. 2006-000840, Feb. 28, 2007.
Office Action, JP Appln. No. 2009-523977, Jul. 17, 2012.
Office Action, JP Appln. No. 2010-525043, May 7, 2013.
Office Action, JP Appln. No. 2010-525045, Mar. 5, 2013.
Office Action, JP Appln. No. 2010-525046, Mar. 5, 2013.
Office Action, JP Appln. No. 2010-525047, Dec. 25, 2012.
Office Action, JP Appln. No. 2010-527121, Apr. 2, 2013.
Office Action, JP Appln. No. 2010-528188, Mar. 26, 2013.
Office Action, KR Appln. No. 9-5-2011-052371668, Sep. 16, 2011.
International Preliminary Report, PCT/US2005/016513, Nov. 16, 2006.
International Preliminary Report, PCT/US2005/021518, Jan. 4, 2007.
International Preliminary Report, PCT/US2005/040380, May 18, 2007.
International Preliminary Report, PCT/US2006/012067, Oct. 11, 2007.
International Preliminary Report, PCT/US2006/014852, Nov. 1, 2007.
International Preliminary Report, PCT/US2007/074367, Feb. 5, 2009.
International Search Report, PCT/US2004/017666, Apr. 2, 2005.
International Search Report, PCT/US2005/016513, Aug. 9, 2005.
International Search Report, PCT/US2005/021518, Jan. 3, 2006.
International Search Report, PCT/US2005/040380, Mar. 15, 2006.
International Search Report, PCT/US2006/012067, Aug. 9, 2006.
International Search Report, PCT/US2006/014852, Dec. 4, 2006.
International Search Report, PCT/US2007/074367, Dec. 17, 2007.
International Search Report, PCT/US2007/075448, Jul. 4, 2008.
International Search Report, PCT/US2008/076281, Jan. 13, 2009.
International Search Report, PCT/US2008/076285, Dec. 30, 2008.
International Search Report, PCT/US2008/076290, Jan. 30, 2009.
International Search Report, PCT/US2008/076294, Dec. 29, 2008.
International Search Report, PCT/US2008/077562, Jun. 12, 2009.
International Search Report, PCT/US2008/078838, Jan. 16, 2009.
Notice of Allowance and Fees due, U.S. Appl. No. 08/071,218, Aug. 7, 1995.
Notice of Allowance and Fees due, U.S. Appl. No. 08/363,228, Apr. 9, 1996.
Notice of Allowance and Fees due, U.S. Appl. No. 08/480,666, Sep. 5, 1996.
Notice of Allowance and Fees due, U.S. Appl. No. 08/863,448, Feb. 17, 1999.
Notice of Allowance and Fees due, U.S. Appl. No. 09/811,317, Jul. 14, 2003.
Notice of Allowance and Fees due, U.S. Appl. No. 11/154,749, Feb. 17, 2011.
Notice of Allowance and Fees due, U.S. Appl. No. 11/277,896, Oct. 23, 2009.
Office Action, U.S. Appl. No. 08/071,218, Dec. 7, 1994.
Office Action, U.S. Appl. No. 08/071,218, Apr. 20, 1995.
Office Action, U.S. Appl. No. 08/363,228, Oct. 3, 1995.
Office Action, U.S. Appl. No. 08/363,228, Mar. 27, 1996.
Office Action, U.S. Appl. No. 08/479,654, Aug. 21, 1995.
Office Action, U.S. Appl. No. 08/479,654, Mar. 1, 1996.
Office Action, U.S. Appl. No. 08/479,654, Jan. 24, 1997.

(56) References Cited

OTHER PUBLICATIONS

Office Action, U.S. Appl. No. 08/479,654, Aug. 5, 1997.
Office Action, U.S. Appl. No. 08/480,666, Feb. 9, 1996.
Office Action, U.S. Appl. No. 08/480,666, Sep. 5, 1996.
Office Action, U.S. Appl. No. 08/480,666, Oct. 16, 1996.
Office Action, U.S. Appl. No. 08/480,666, Nov. 22, 1996.
Office Action, U.S. Appl. No. 08/863,448, Sep. 24, 1997.
Office Action, U.S. Appl. No. 08/863,448, Apr. 27, 1998.
Office Action, U.S. Appl. No. 09/811,317, Feb. 28, 2002.
Office Action, U.S. Appl. No. 09/811,317, Aug. 13, 2002.
Office Action, U.S. Appl. No. 09/811,317, Dec. 30, 2002.
Office Action, U.S. Appl. No. 09/952,629, Mar. 14, 2006.
Office Action, U.S. Appl. No. 09/952,629, Dec. 1, 2006.
Office Action, U.S. Appl. No. 09/952,629, Jun. 27, 2007.
Office Action, U.S. Appl. No. 09/952,629, Mar. 18, 2008.
Office Action, U.S. Appl. No. 09/952,629, Oct. 27, 2008.
Office Action, U.S. Appl. No. 09/952,629, Jun. 2, 2009.
Office Action, U.S. Appl. No. 10/772,565, Mar. 4, 2009.
Office Action, U.S. Appl. No. 10/772,565, Nov. 24, 2009.
Office Action, U.S. Appl. No. 10/772,565, Jul. 7, 2010.
Office Action, U.S. Appl. No. 10/772,565, Jan. 4, 2011.
Office Action, U.S. Appl. No. 10/773,523, Oct. 5, 2006.
Office Action, U.S. Appl. No. 11/123,327, Dec. 11, 2008.
Office Action, U.S. Appl. No. 11/123,327, Oct. 14, 2009.
Office Action, U.S. Appl. No. 11/123,327, Jul. 20, 2010.
Office Action, U.S. Appl. No. 11/154,749, Aug. 18, 2008.
Office Action, U.S. Appl. No. 11/154,749, Jan. 23, 2009.
Office Action, U.S. Appl. No. 11/154,749, Oct. 26, 2009.
Office Action, U.S. Appl. No. 11/154,749, Jun. 7, 2010.
Office Action, U.S. Appl. No. 11/269,378, Aug. 20, 2008.
Office Action, U.S. Appl. No. 11/269,378, Apr. 28, 2009.
Office Action, U.S. Appl. No. 11/277,896, Apr. 14, 2009.
Office Action, U.S. Appl. No. 11/379,360, Apr. 3, 2009.
Office Action, U.S. Appl. No. 11/379,360, Nov. 23, 2009.
Office Action, U.S. Appl. No. 11/379,360, Aug. 25, 2010.
Office Action, U.S. Appl. No. 11/828,193, Nov. 30, 2009.
"Cellular-Wi-Fi Integration", InterDigital, Jun. 2012, pp. 1-26.
"Integrated Femto-Wifi (IFW) Networks", Small Cell Forum Ltd, Feb. 2012, pp. 1-37.
"Intelligent, Seamless and Secure ANDSF," Alcatel-Lucent Mobile Advertising Solution, 2012, pp. 1-3.
"Picochip & InterDigital demo gateway with integrated 3G femto & Wi-Fi", Mindspeed, Jun. 2011, p. 1.
3G Small Cell Mobile Home Gateway with ADSL2 +/ GigE Dual WAN, 802.11 n. DEVG2000F Product Brief, NETGEAR, 2012, pp. 1-2.
Chen, et al., "Personalized Multimedia Services Using a Mobile Service Platform", IEEE 2002, pp. 918-225.
Chitrapu, et al. "Opportunities & Challenges of Integrated Small Cell-WiFi Networks", Small Cell Forum Ltd, 2012, pp. 1-28.
Farries, et al: "Optical Branching Devices for Avionic Passive Optical Network" Avionics, Fiber-Optics and Photonics Technology Conference, 2007 IEEE, IEEE, PI, Oct. 1, 2007, pp. 76-77.
Gratschew, et al., "A Multimedia Messaging Platform for Content Delivering", IEEE 2003, pp. 431-435.
Ibenthal, et al.,"Multimedia im Fahrzeug: Dienste und Technik", Fernseh und Kino-Technik 54, Jahrgang Nr. Mar. 2000, pp. 100-105.
Kartalopoulos S V: "Consumer Communications in the Next Generation Access Network" Consumer Communications and Networking Conference, 2004 CCNC, First IEEE, Las Vegas, NV, USA Jan. 5-8, 2004, Piscataway, NJ (Jan. 5, 2004), pp. 273-278.
Norris, "NETGEAR Announces the World's First Fully Integrated Quad-Play Small Cell Home Gateway for the Alcatel-Lucent Global Network" Press Release, Feb. 2012, pp. 1-2.

\* cited by examiner

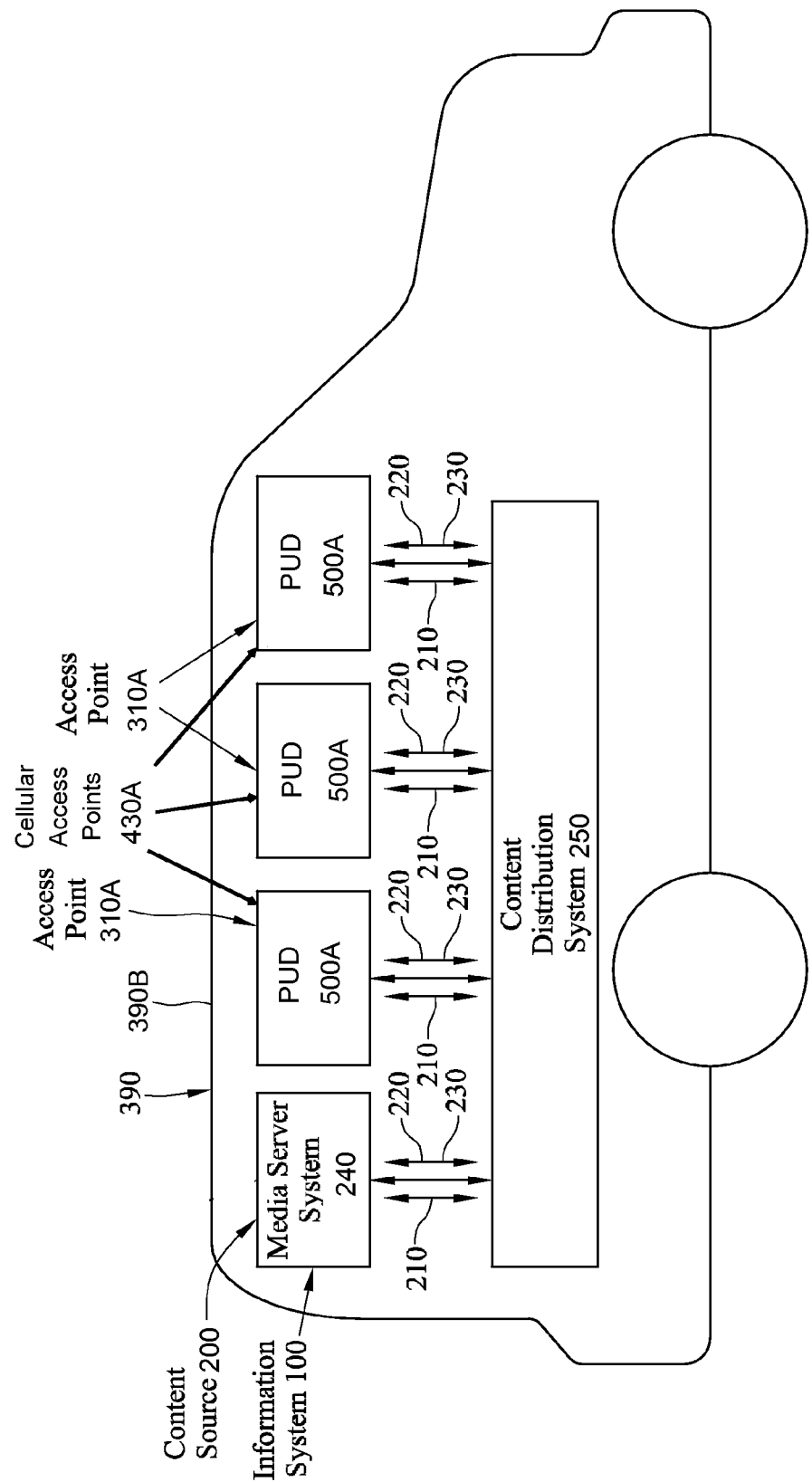

SYSTEM AND METHOD FOR PROVIDING MULTI-MODE WIRELESS DATA DISTRIBUTION

CROSS-REFERENCE TO RELATED APPLICATIONS

This application claims priority from U.S. Provisional Application No. 61/800,706, filed Mar. 15, 2013. Priority from the foregoing provisional application is expressly claimed and the disclosure thereof is incorporated herein by reference in its entirety and for all purposes.

FIELD

The present disclosure relates generally to content distribution systems and more particularly, but not exclusively, to systems for enabling data distribution over a multi-mode wireless network installed aboard passenger vehicles.

BACKGROUND

Passenger vehicles, such as automobiles and aircraft, often include vehicle information systems for satisfying passenger demand for access to viewing content, such as entertainment, information content, or other viewing content, while traveling.

Conventional vehicle information (or entertainment) systems typically include overhead cabin video systems or seat-based video systems with individual controls such that viewing content is selectable by the passengers. The viewing content can include audio and video content that is derived from a variety of content sources. For instance, prerecorded viewing content, such as motion pictures and music, can be provided by internal content sources, such as audio and video players, that are installed at a headend system of the vehicle. The conventional vehicle information systems likewise can include an antenna system for receiving viewing content, such as live television programming and/or Internet content, transmitted from one or more content providers (or sources) that are external to, and/or remote from, the vehicle.

Furthermore, some vehicle information systems allow passengers to integrate their own personal media devices to facilitate the selection of changing passenger viewing content. These personal media devices are integrated via wired and/or wireless communications. An example of such a passenger information system is described in United States Patent Publication No. 2009/0119721 A1, application Ser. No. 12/210,624, entitled "System and Method for Interfacing a Portable Media Device with a Vehicle Information System," filed on Sep. 15, 2008, which is hereby incorporated by reference in its entirety and fully owned by the assignee of the present application.

Since passenger demand for this viewing content on aircraft video systems and personal media devices is continually evolving, conventional vehicle information systems are experiencing elevated wireless traffic with increased passenger data usage. Communication between the headend system and the personal media devices can include wireless fidelity (Wi-Fi)-based (e.g., Institute of Electrical and Electronics Engineers (IEEE) Standard 802.11) and/or cellular-based wireless networks (e.g., Universal Mobile Telecommunications Systems (UMTS), third-generation (3G) mobile phone systems, fourth-generation (4G) mobile phone systems, and long-term evolution (LTE) standards). Selection of the preferred network for data communication often is based on traffic type. The Wi-Fi network typically is used to access larger data transfers (e.g., streaming both internal and external content sources); while, the cellular-based networks are reserved for roaming cell-type services (e.g., voice calling, texting, and other services). This allocation of network traffic types over the various wireless networks depends on, for example, bandwidth, cellular range, roaming, and other restrictions (e.g., additional fees) set by the cellular service provider.

As an additional drawback, current wireless networks on aircraft effectively operate independently of one another. Selecting a preferred network connection ignores current or expected loads (e.g., coordinated system level load analysis, balancing, and handoff schemes) such that several channels may be left available and unused. Accordingly, some, or all, of the passengers traveling aboard the aircraft can be inhibited from enjoying the viewing content because of the capacity and use of the various wireless networks.

In view of the foregoing, a need exists for an improved content distribution system and method for enabling data distribution over a multi-mode wireless network installed aboard passenger vehicles in an effort to overcome the deficiencies of conventional passenger information systems.

BRIEF DESCRIPTION OF THE DRAWINGS

FIG. 4B is an exemplary top-level drawing illustration an alternative embodiment of the information system of FIG. 2, wherein the information system is installed aboard an automobile.

DETAILED DESCRIPTION OF THE PREFERRED EMBODIMENTS

Since distribution of viewing content within currently-available passenger information systems is limited by various bandwidth, cellular range, roaming, and content-type restrictions, a coordinated content distribution system that includes a load level analysis for making use of available allocated, pre-allocated, or spare, capacity on various wireless networks can prove desirable and provide a basis for a wide range of system applications, such as vehicle information systems for use aboard automobiles, aircrafts, and other types of passenger vehicles during travel. This result can be achieved, according to one embodiment disclosed herein, by an information system 100 as illustrated in FIGS. 1A-B.

Figure 1A:
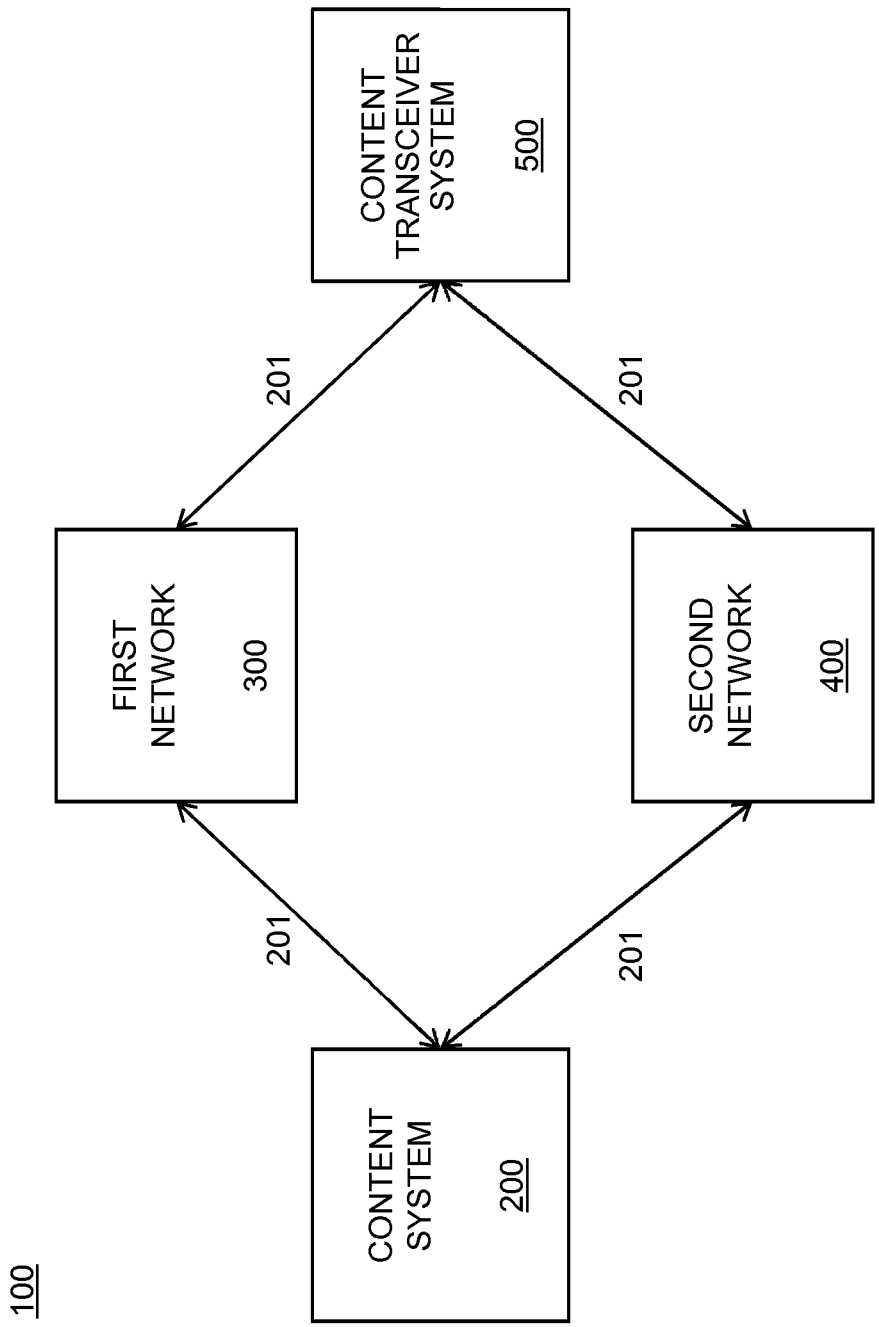
FIG. 1A is an exemplary top-level drawing illustrating an embodiment of an information system, wherein a content system communicates with a content transceiver system over a first network and a second network.

Turning to FIG. 1A, the information system 100 is illustrated as including one or more content systems 200 being configured to communicate with one or more content transceiver systems 500. In order to distribute viewing content 210 between the content systems 200 and the transceiver systems 500, the information system 100 can exploit the available, or pre-allocated, bandwidth and high-speed connectivity of a first network 300 and/or a second network 400 to maintain a low-cost, high-capacity data connection. The information system 100 thereby can increase the total capacity for content distribution by making use of available allocated, pre-allocated, or spare capacity on the second network 400—a medium typically reserved for services specific to the second network.

Figure 1B:
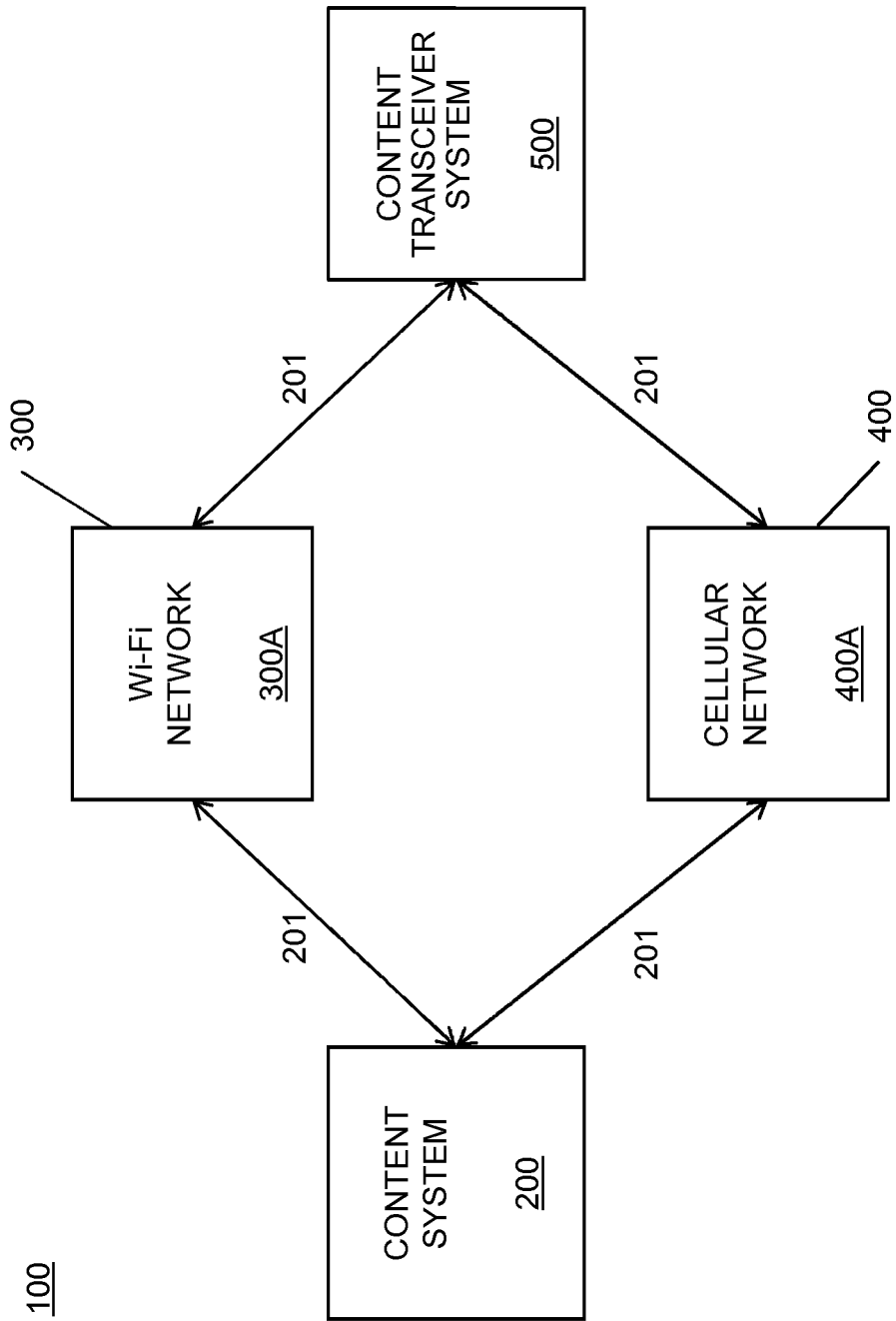
FIG. 1B is an exemplary top-level drawing illustrating an alternative embodiment of the information system of FIG. 1A, wherein the content system communicates with the content transceiver system over a Wi-Fi network and a cellular network.

In an embodiment illustrated in FIG. 1B, the content systems 200 can exchange viewing content 210 with the content transceiver systems 500 in the manner discussed above over the available, or pre-allocated, bandwidth and high-speed connectivity of a wireless fidelity (Wi-Fi) network 300A and/or a cellular network 400A to maintain a low-cost, high-capacity data connection. Therefore, the total capacity for content distribution includes the available allocated, pre-allocated, or spare capacity on the cellular network 400A a medium typically reserved for cellular roaming services.

When both the first network 300 of FIG. 1A (or Wi-Fi network 300A of FIG. 1B) and the second network 400 (or cellular network 400A of FIG. 1B) are available, the information system 100 can dynamically route the viewing content 210 across either network (or both networks) to maintain optimum transfer speeds. Accordingly, delays in uploading, downloading, and streaming of viewing content 210 between the content systems 200 and the content transceiver systems 500 is minimized through the simultaneous use of multiple wireless networks.

Although the information system 100 can be disposed in a fixed location, such as a building, the information system 100 likewise advantageously can be applied in portable system applications. For example, turning to FIG. 2A, the information system 100 is shown as being configured for installation aboard any of a wide variety of passenger vehicles 390 (shown in FIGS. 4A-B). For illustration purposes only, the content systems 200 communicate with the content transceiver systems 500 (described in FIGS. 1A-B), such as one or more personal (or portable) user devices 500A, via a real-time content distribution system 250.

The content distribution system 250 includes at least one media system controller and file server 240 that can be provided as an information system controller for providing overall system control functions for the information system 100 and/or the content systems 200. In order to exchange viewing content 210 between the content systems 200 and the user devices 500A, the content distribution system 250 preferably includes a load analysis/balance and control system 255 for dynamically routing the viewing content 210 over the first network 300 (shown in FIG. 1A), such as an on-board Wi-Fi network 300B (in accordance with IEEE Standard 802.11), and/or the second network 400 (shown in FIG. 1A), such as an on-board cellular network 400B. The information system 100 thereby can increase the total capacity for content distribution by making use of available allocated, pre-allocated, or spare capacity on the on-board cellular network 400B.

As illustrated, the on-board cellular network 400B includes at least one network switching subsystem (NSS) (or cellular core network) interface, such as a Global System for Mobile Communications (GSM) core network interface 410A, or third-generation (3G)/fourth-generation (4G) core network interfaces (not shown) without limitation, for voice traffic 211A, and at least one cellular data network interface, such as a packet-oriented data network interface 420A for digital data 211B. In one embodiment, the NSS can be provided as a core circuit-switched network for routing voice calls, short message service (SMS), circuit switched data calls, and so on. Exemplary packet-orientated data network interfaces 420A support 3G mobile phone systems (e.g., Enhanced Data for GSM Evolution (EDGE), Universal Mobile Telecommunications Systems (UMTS), Wideband Code Division Multiple Access (WDMA), CDMA2000, etc.) and 4G mobile phone systems (e.g., Long Term Evolution (LTE), wireless metropolitan-area networks (MANs) (which also are known as WiMax Wireless Broadband, in accordance with IEEE Standard 802.16), etc.) technologies. Additionally, Wi-Fi network 300B can include a local area network (LAN), a wide area network (WAN), a campus area network (CAN), and/or a personal area network (PAN), of any kind.

The cellular network 400B additionally includes an operator core network 450 maintained by a roaming cellular service provider. As mentioned above, the personal user devices 500A communicating with the on-board cellular network 400B typically depend on services provided (e.g., voice calling, SMS, and so on) through the operator core network 450. Accordingly, usage of the cellular network 400B may require payment of a fee to the roaming cellular service provider before access to either of the GSM core network interface 410A or the packet-oriented data network interface 420A is permitted. The fee for data transmission over the cellular network 400B can vary based on, for example, the location of the data transmission and traffic type.

The cellular network 400B is shown to include an Internet Protocol (IP) bypass system 425A for providing a cellular transmission path that bypasses the GSM core network interface 410A and the packet-oriented data network interface 420A. The load analysis/balance and control system 255 advantageously reroutes network packets (e.g., viewing content 210)—typically distributed over the Wi-Fi network 300B—through the cellular network 400B via the bypass system 425A (i.e., without being routed through the operator core network 450). Stated somewhat differently, both of the Wi-Fi network 300B and the cellular network 400B can be used to distribute viewing content 210 for maintaining the best overall user experience without incurring additional charges from the roaming cellular service provider.

Figure 2A:
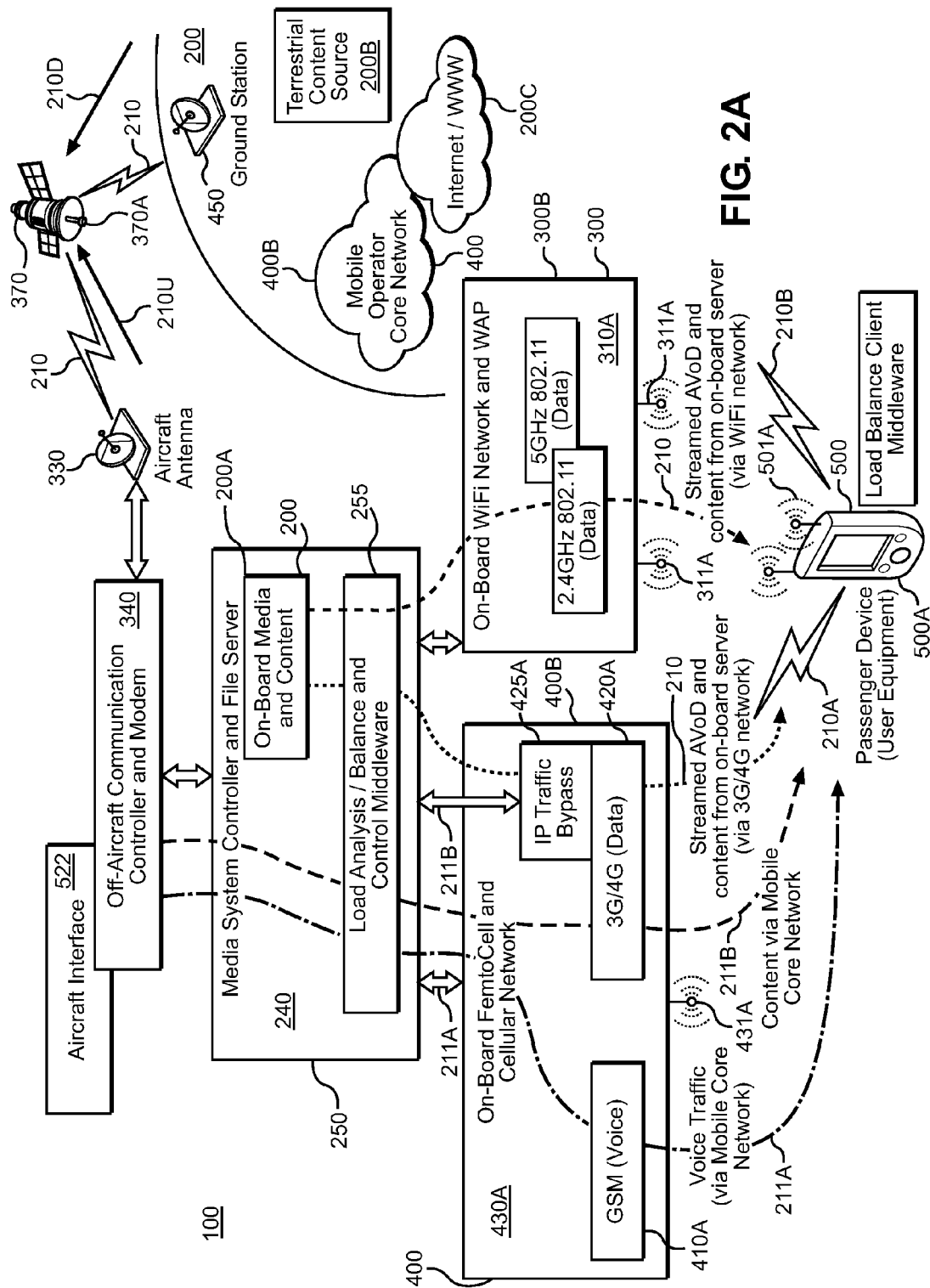
FIG. 2A is a detail drawing illustrating an embodiment of the information system of FIGS. 1A-B, wherein the information system includes discrete system components installed throughout a passenger vehicle.
Figure 2B:
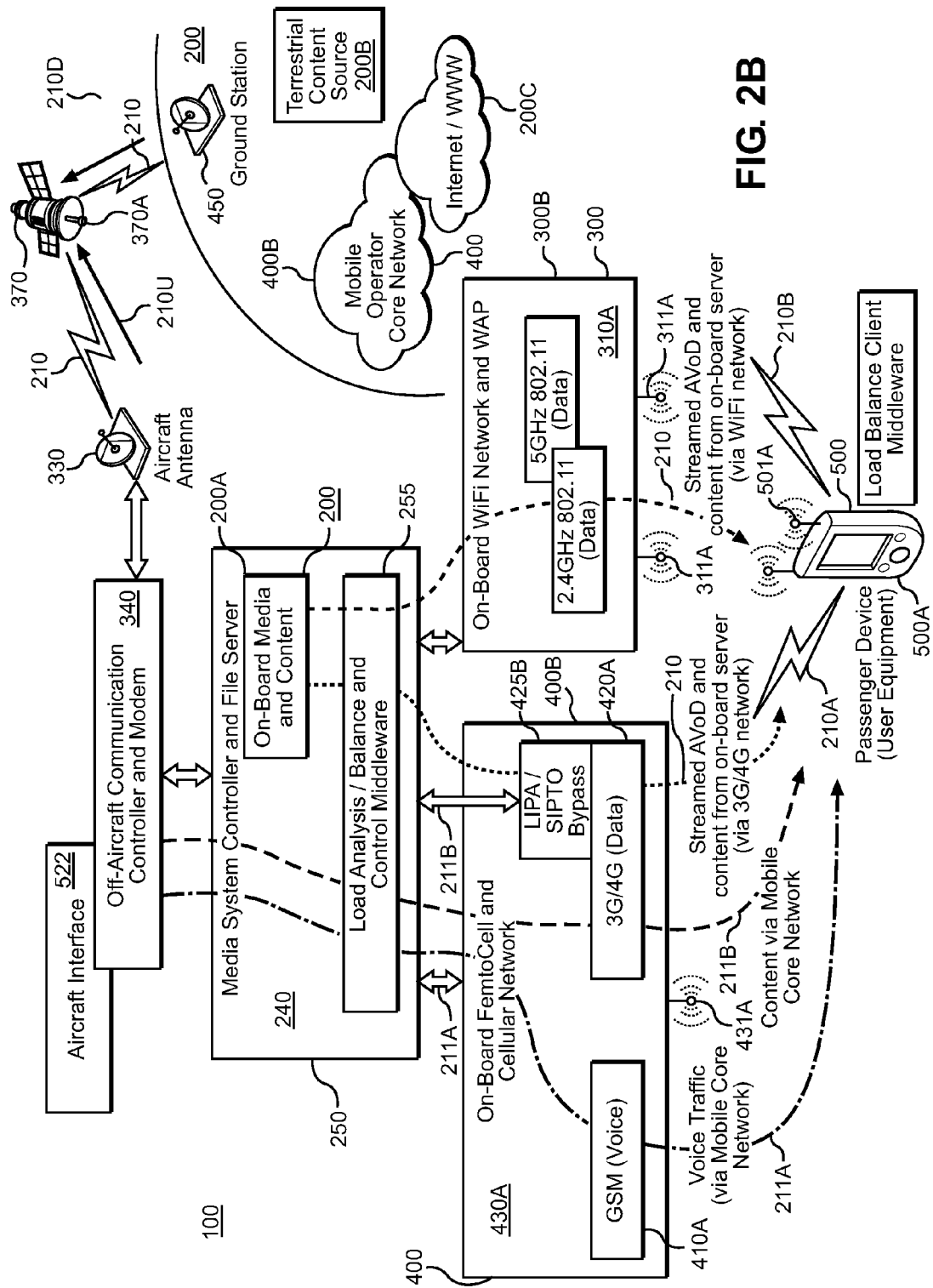
FIG. 2B is a detail drawing illustrating another embodiment of the information system of FIGS. 1A-B, wherein the information system includes discrete system components installed throughout a passenger vehicle.

In one embodiment, the IP bypass system 425A includes a Local Internet Protocol Access (LIPA) and Selected Internet Protocol Traffic Offload (SIPTO) bypass system, such as a LIPA and SIPTO bypass system 425B illustrated in FIG. 2B. Accordingly, the load analysis/balance and control system 255 reroutes network packets (e.g., viewing content 210)—typically distributed over the Wi-Fi network 300B—through the cellular network 400B via the LIPA/SIPTO protocol bypass system 425B (i.e., without being routed through the operator core network 450).

The content systems 200 can include one or more internal content systems, such as one or more on-board media and content (or file) servers 200A, that preferably are installed aboard the vehicle 390, and/or remote (or terrestrial) content systems 200B, that can be external from the vehicle 390. The media and content server 200A can be used for providing local storage of preprogrammed content and/or downloaded viewing content 210D aboard the vehicle 390, as desired. Although not shown, the media system controller and file server 240 can include, and/or communicate with, one or more conventional peripheral media storage systems, including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the download viewing content 210D. The media system controller and file server 240 likewise can support decoding and/or digital rights management (DRM) functions of the information system 100.

Each content system 200, for example, can be provided in the manner set forth in the commonly assigned U.S. patents, entitled "SYSTEM AND METHOD FOR DOWNLOADING FILES," U.S. Pat. No. 8,135,773, filed on Feb. 4, 2004; entitled "SYSTEM AND METHOD FOR MANAGING CONTENT ON MOBILE PLATFORMS," U.S. Pat. No. 7,984,190, filed on May 6, 2005; entitled "PORTABLE MEDIA DEVICE AND METHOD FOR PRESENTING VIEWING CONTENT DURING TRAVEL," U.S. Pat. No. 7,945,934, filed on Jun. 15, 2005; entitled "SYSTEM AND METHOD FOR RECEIVING BROADCAST CONTENT ON A MOBILE PLATFORM DURING INTERNATIONAL TRAVEL," U.S. Pat. No. 7,715,783, filed on Nov. 7, 2005; entitled "SYSTEM AND METHOD FOR RECEIVING BROADCAST CONTENT ON A MOBILE PLATFORM DURING TRAVEL," U.S. Pat. No. 8,326,282, filed on Sep. 24, 2008, the respective disclosures of which are hereby incorporated herein by reference in their entireties.

As desired, the content distribution system 250 can include one or more access points, such as a wireless access point (WAP) 310A shown in FIGS. 2A-B, for communicating with the personal user devices 500A over the Wi-Fi network 300B. The WAP 310A is shown as including an access point antenna system 311A. The access point antenna system 311A can transmit and/or receive broadband radio frequency communication signals 210B between the information system 100 and the user devices 500A. Each of the personal user devices 500A includes a device antenna system 501A for communicating with the access point antenna system 311A. The access point antenna system 311A and the device antenna system 501A can comprise any conventional types of antenna systems suitable for transmitting and/or receiving the broadband radio frequency communication signals between the information system 100 and the personal user devices 500A.

Additionally, and/or alternatively, the content distribution system 250 can further include one or more cellular access points, such as an on-board FemtoCell system 430A (e.g., a Home Node B (HNB) or a Home eNode B (HeNB)) shown in FIGS. 2A-B, or an on-board PicoCell system 810 (shown in FIG. 7), for communication with the personal user devices 500A over the cellular network 400B. It should be understood that HNB/HeNB is a 3rd Generation Partnership Project (3GPP) Standard radio access solution. The FemtoCell system 430A is shown as including a cellular antenna system 431A for transmitting and/or receiving cellular communication signals 210A between the information system 100 and the personal user devices 500A. The cellular antenna system 431A can comprise any conventional type of cellular antenna systems, such as one or more leaky feeder systems 850 (shown in FIGS. 5, 7) distributed throughout the vehicle 390, allowing two-way radio communication. Accordingly, the device antenna system 501A and the cellular antenna system 431A can be configured for transmitting and/or receiving the cellular communication signals 210A between the information system 100 and the personal user devices 500A.

Viewing content 210 available via the content system 200 can comprise any conventional type of audio and/or video viewing content, such as stored (or time-delayed) viewing content, live (or real-time) viewing content, and/or interactive viewing content, in the manner set forth in the above-referenced U.S. patents, entitled "SYSTEM AND METHOD FOR DOWNLOADING FILES," U.S. Pat. No. 8,135,773, filed on Feb. 4, 2004; entitled "PORTABLE MEDIA DEVICE AND METHOD FOR PRESENTING VIEWING CONTENT DURING TRAVEL," U.S. Pat. No. 7,945,934, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 7,715,783, filed on Nov. 7, 2005. Exemplary viewing content 210 can include media, content, data files, maintenance information, performance information, system usage information, flight planning information (e.g., electronic flight bag information), aircraft operational information (e.g., flight operational quality assurance (FOQA), flight data monitoring (FDM) information, and so on), calling content, text messaging, electronic mail (or e-mail), television programming content, music content, podcast content, photograph album content, audiobook content, movie content, and/or game content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. The exemplary viewing content as shown and described herein are not exhaustive and are provided herein for purposes of illustration only and not for purposes of limitation.

The viewing content 210 can be presented by the personal user device 500A in any conventional manner, preferably substantially in real-time. For example, the personal user device 500A can download the viewing content in the manner disclosed in the aforementioned co-pending U.S. patent applications, entitled "SYSTEM AND METHOD FOR DOWNLOADING FILES," U.S. Pat. No. 8,135,773, filed on Feb. 4, 2004; entitled "SYSTEM AND METHOD FOR MANAGING CONTENT ON MOBILE PLATFORMS," U.S. Pat. No. 7,984,190, filed on May 6, 2005; entitled "PORTABLE MEDIA DEVICE AND METHOD FOR PRESENTING VIEWING CONTENT DURING TRAVEL," U.S. Pat. No. 7,945,934, filed on Jun. 15, 2005; entitled "SYSTEM AND METHOD FOR RECEIVING BROADCAST CONTENT ON A MOBILE PLATFORM DURING INTERNATIONAL TRAVEL," U.S. Pat. No. 7,715,783, filed on Nov. 7, 2005; entitled "SYSTEM AND METHOD FOR RECEIVING BROADCAST CONTENT ON A MOBILE PLATFORM DURING TRAVEL," U.S. Pat. No. 8,326,282, filed on Sep. 24, 2008, the disclosures of which were incorporated herein by reference above. As desired, the personal user device 500A likewise can store the downloaded viewing content. The personal user device 500A thereby can present the viewing content at any time regardless of whether communication with the content systems 200 is maintained.

The viewing content 210 likewise can be streamed to the personal user device 500A from the content systems 200. Stated somewhat differently, the viewing content 210 can be momentarily stored (or cached) by the personal user device 500A. The viewing content 210 likewise can be streamed in any conventional manner. Illustrative sources for streaming the viewing content 210 can include terrestrial content systems and/or satellite content systems (e.g., terrestrial content system 200B). For example, live television programming can be streamed by one or more terrestrial content system, such as a broadcast television system (not shown), and/or by one or more satellite content system, such as a Direct Broadcast Satellite (DBS) system (not shown). Exemplary systems and methods for streaming viewing content are shown and described in the co-pending U.S. patent application, entitled "PORTABLE MEDIA DEVICE AND METHOD FOR PRESENTING VIEWING CONTENT DURING TRAVEL," U.S. Pat. No. 7,945,934, filed on Jun. 15, 2005.

Being configured to distribute and/or present the viewing content 210 provided by selected content systems 200, the information system 100 can communicate with the content systems 200 in real time and in any conventional manner, including via wired and/or wireless communications. For example, the information system 100 and the terrestrial content system 200B can communicate in any conventional wireless manner, including directly and/or indirectly via an intermediate communication system 370, such as a satellite communication system 370A. The information system 100 thereby can receive the download viewing content 210D from a selected terrestrial content system 200B and/or transmit upload viewing content 210U, including navigation and other control instructions, to the terrestrial content system 200B. As desired, the terrestrial content system 200B can be configured to communicate with other terrestrial content systems (not shown). The terrestrial content system 200B is shown in FIGS. 2A-B as providing access to the Internet 200C. Although shown and describes as comprising the satellite communication system 370A for purposes of illustration, it is understood that the communication system 370 can comprise any conventional type of wireless communication system, such as a cellular communication system and/or an Aircraft Ground Information System (AGIS) communication system (not shown).

To facilitate communications with the terrestrial content systems 200B, the information system 100 can include an aircraft antenna system 330 and an off-aircraft communication controller and modem 340 for exchanging the viewing content with the remote (or terrestrial) content systems 200B. The antenna system 330 preferably is disposed outside the vehicle 390 and can receive downloaded viewing content 210D from the terrestrial content system 200B for providing the received viewing content 210, as processed by the off-aircraft communication controller and modem 340, to the media system controller and file server 240. The off-aircraft communication controller and modem 340 distributes the received viewing content 210 to the personal user devices 500A through the content distribution system 250 as discussed above. The off-aircraft communication controller and modem 340 is shown being in communication with an aircraft interface system 522, which provides an interface between the information system 100 and aircraft avionics equipment (not shown) that can be installed aboard a wide-body aircraft.

The illustrated personal user devices 500A can each store the audio and/or video viewing content 210. Preferably, the personal user devices 500A are smartphones capable of cellular- and/or Wi-Fi-based communications; however, it is understood that the personal user devices 500A can be provided as other handheld devices, such as a laptop computer, a tablet computer, a palmtop computer, a personal digital assistant (PDA), cellular telephone, an iPod® digital electronic media device, an iPhone® digital electronic media device, and/or a MPEG Audio Layer 3 (MP3) device. Other illustrative personal user devices 500A are shown and described in U.S. Pat. No. 8,135,773, entitled "SYSTEM AND METHOD FOR DOWNLOADING FILES," filed on Feb. 4, 2004; U.S. Pat. No. 7,945,934, entitled "PORTABLE MEDIA DEVICE AND METHOD FOR PRESENTING VIEWING CONTENT DURING TRAVEL," filed on Jun. 15, 2005; U.S. Pat. No. 7,715,783, entitled "SYSTEM AND METHOD FOR RECEIVING BROADCAST CONTENT ON A MOBILE PLATFORM DURING INTERNATIONAL TRAVEL," filed on Nov. 7, 2005; U.S. patent application Ser. No. 12/210,624, entitled "SYSTEM AND METHOD FOR INTERFACING A PORTABLE MEDIA DEVICE WITH A VEHICLE INFORMATION SYSTEM," filed on Sep. 15, 2008; U.S. patent application Ser. No. 12/210,636, entitled "MEDIA DEVICE INTERFACE SYSTEM AND METHOD FOR VEHICLE INFORMATION SYSTEMS," filed Sep. 15, 2008; U.S. patent application Ser. No. 12/210,652, entitled "MEDIA DEVICE INTERFACE SYSTEM AND METHOD FOR VEHICLE INFORMATION SYSTEMS," filed on Sep. 15, 2008; and U.S. patent application Ser. No. 12/210,689, entitled "PORTABLE USER CONTROL DEVICE AND METHOD FOR VEHICLE INFORMATION SYSTEMS," tiled on Sep. 15, 2008, which are all assigned to the assignee of the present application and the respective disclosures of which are hereby incorporated by reference in their entireties.

In order for more than one personal user device 500A to share access to the wireless networks (e.g., Wi-Fi network 300B and/or cellular network 400B), each of the Wi-Fi network 300B and the cellular network 400B is configured to authenticate the personal user devices 500A. Exemplary forms of authentication mechanisms for wireless networks adopt the IEEE 802.1x protocol and may include, for example, Extensible Authentication Protocol (EAP) methods (e.g., Lightweight EAP (LEAP), EAP-Transport Layer Security (EAP-TLS), EAP-MD5, EAP-Protected One-Time Password (EAP-POTP), EAP-Pre-Shared Key (EAP-PSK), EAP-Tunneled Transport Layer Security (EAP-TTLS), EAP-Internet Key Exchange protocol version 2 (EAP-IKEv2), EAP-Flexible Authentication via Secure Tunneling (EAP-FAST), EAP for GSM Subscriber Identity Module (EAP-SIM), EAP Method for UMTS Authentication and Key Agreement (EAP-AKA), EAP-AKA Prime (EAP-AKA'), EAP-Generic Token Card (EAP-GTC), and EAP with the Encrypted key exchange (EAP-EKE)). Once authenticated, the Wi-Fi network 300B and/or the cellular network 400B opens a respective secure data channel to the authenticated personal user device 500A to protect the privacy of data exchanged (e.g., viewing content 210) with the authenticated device 500A.

The load analysis/balance and control system 255 can be provided in any conventional manner, such as via one or more hardware components and/or software components, and can be disposed proximately to, and/or remotely from, the content systems 200. In another embodiment, the load analysis/balance and control system 255 may be installed at each personal user device 500A (not shown). As illustrated in FIGS. 2A-B, the exemplary load analysis/balance and control system 255 monitor incoming traffic loads, such as viewing content 210, voice traffic 211A, and/or digital data 211B. In order to balance the network traffic loads across all available wireless networks (e.g., the Wi-Fi network 300B and the cellular network 400B), the load analysis/balance and control system 255 distributes the network traffic based on, for example, current loads, projected loads, number of users, media type, device type, display resolutions, supported radio interfaces, available radio channels, streaming rates, size of media files, passenger viewing and browsing behavior, and so on. For example, the load analysis/balance and control system 255 can include instruction code, such as software or firmware, stored on a computer-readable medium that can be executed by a processor for distributing the network traffic. In one embodiment, the medium can comprise a non-transitory storage medium.

In one example, the load analysis/balance and control system 255 receives mobile metrics from a selected device 500A. These mobile metrics includes, but are not limited to radio frequency (RF) conditions, signal quality, signal speeds, and device classifications. The load analysis/balance and control system 255 analyses the network traffic for media content type and throughput rate available via the Wi-Fi network 300B and the cellular network 400B. Based on a set of predefined conditions (e.g., use of a selected Wi-Fi network 300B or cellular network 400B until a congestion point, such as 85-90% of the bandwidth for either the Wi-Fi network 300B or cellular network 400B, is reached), the load analysis/balance and control system 255 distributes the network traffic to optimize network bandwidth. These predefined conditions can be modified as desired. Additional examples of methods by which the load analysis/balance and control system 255 distributes network traffic are discussed below with reference to FIGS. 8A-E.

Figure 3A:
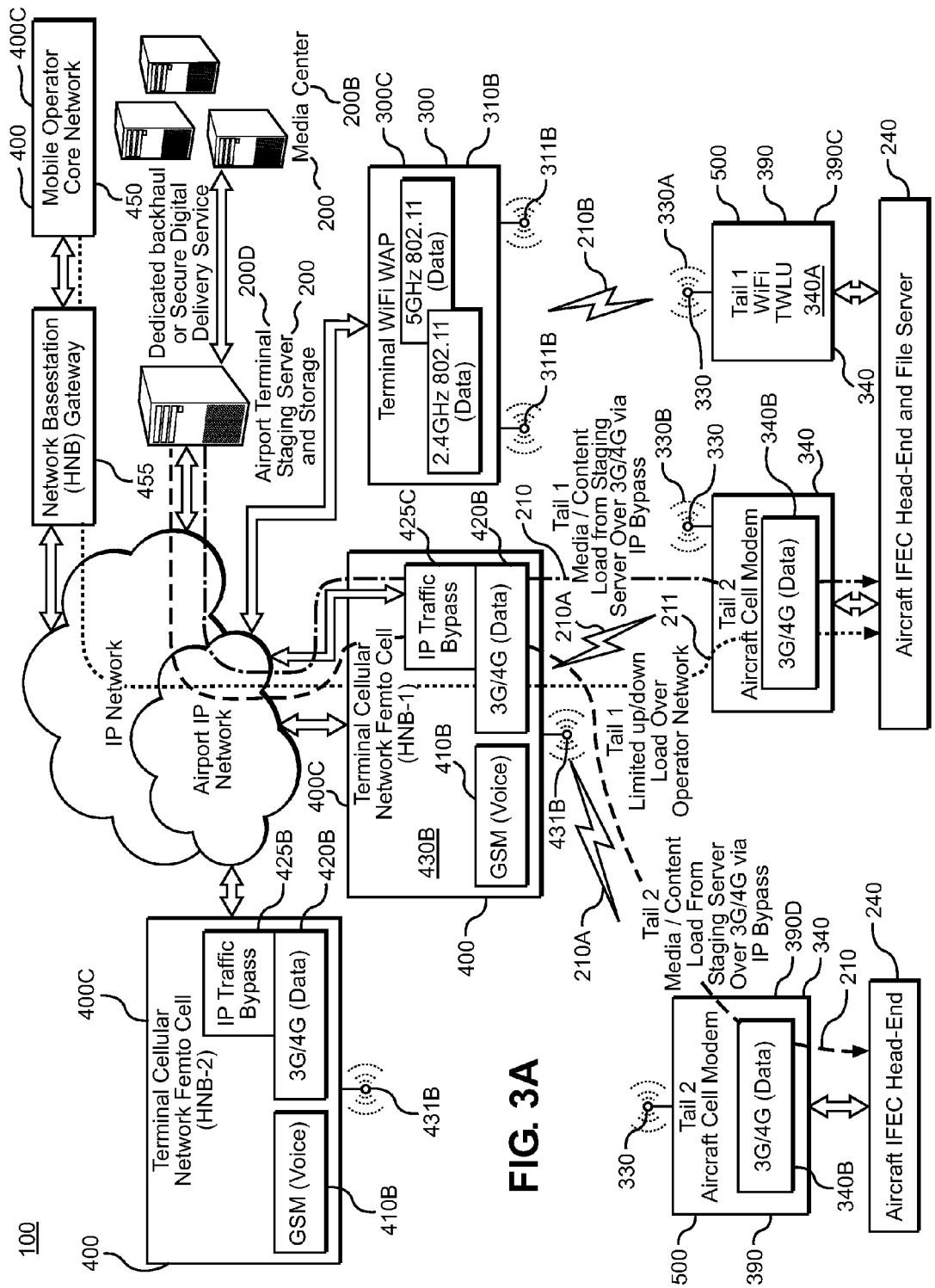
FIG. 3A is a detail drawing illustrating an embodiment of the information system of FIGS. 1A-B, wherein content is provided to a passenger vehicle according to the system of FIG. 1.

Although the information system 100 can be used to distribute the viewing content 210 throughout the vehicle 390 to the one or more personal user devices 500A, as shown in FIGS. 2A-B, the information system 100 likewise advantageously can be used to load and off-load viewing content 210 between a terrestrial source and at least one of the vehicles 390. Turning to FIG. 3A, the information system 100 is shown as being configured for installation at a fixed location, such as an airport terminal. The content systems 200 (shown in FIGS. 1A-B) include a staging server and storage system 200D for preparing content 210 provided by the terrestrial content system 200B. The staging server and storage system 200D is preferably installed at a location remote from the vehicle 390 (e.g., the airport terminal) and communicates with the transceiver systems 500 (shown in FIGS. 1A-B), such as vehicles 390. In order to distribute viewing content 210 provided by the terrestrial content system 200B to the one or more vehicles 390, the terrestrial content system 200B includes the load analysis/balance and control system 255 for dynamically routing the viewing content 210 over the first network 300 (shown in FIG. 1A), such as a terminal Wi-Fi network 300C, and/or the second network 400 (shown in FIG. 1A), such as a terminal cellular network 400C. However, it should be understood that the load analysis/balance and control system 255 can be installed in any server in communication with the first network 300 and second network 400. The information system 100 thereby can increase the total capacity for simultaneous content distribution to at least one of the passenger vehicles 390 approaching an airport terminal, taxiing near a gate, or parked at the gate by making use of available allocated or spare capacity on a selected terminal cellular network 400C to supplement the bandwidth provided by the Wi-Fi network 300C.

As described in more detail above with reference to FIGS. 2A-B, the terminal cellular network 400C includes at least one NSS interface, such as a GSM core network interface 410B, or 3G/4G core network interfaces (not shown), and at least one cellular data network interface, such as a packet-oriented data network interface 420B. Services routed through the cellular network 400C via the operator core network 450 (e.g., cellular data 211), for example, over a Universal Terrestrial Radio Access Network (UTRAN)/evolved UTRAN (eUTRAN) HNB gateway (HNB-GW) 455, may incur charges from the roaming cellular service provider. Therefore, the terminal cellular network 400C includes an IP bypass system 425C for providing a cellular transmission path that bypasses the GSM core network interface 410B and the packet-oriented data network interface 420B. Stated in another way, the IP bypass system 425C provides a transmission medium that avoids the operator core network 450 and any related service restrictions.

Figure 3B:
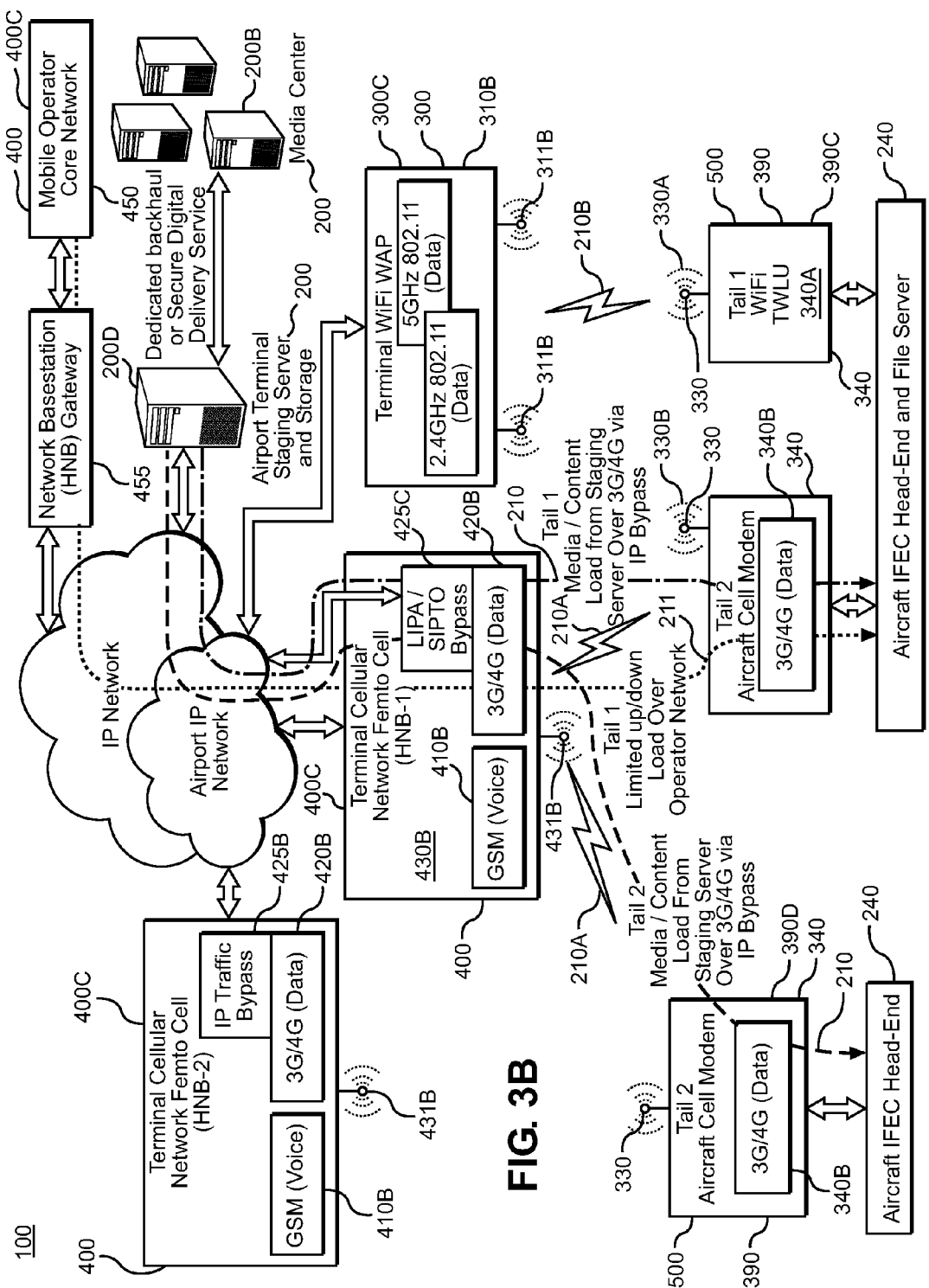
FIG. 3B is a detail drawing illustrating another embodiment of the information system of FIGS. 1A-B, wherein content is provided to a passenger vehicle according to the system of FIG. 1.

In one embodiment, the IP bypass system 425C includes a LIPA and SIPTO bypass system, such as a LIPA/SIPTO bypass system 425D illustrated in FIG. 3B. Accordingly, the LIPA/SIPTO bypass system 425D provides a cellular transmission path that bypasses the GSM core network interface 410B and the packet-oriented data network interface 420B.

The information system 100 includes one or more terrestrial wireless access points 310B for communicating with the vehicles 390 over the Wi-Fi network 300C. Each of the terrestrial WAPs 310B is shown as including an access point antenna system 311B for transmitting and/or receiving the broadband radio frequency communication signals 210B. To facilitate communications with the terrestrial content system 200B and staging server and storage system 200D, the aircraft antenna 330 includes a Wi-Fi antenna system 330A configured for transmitting and/or receiving the broadband radio frequency communication signals 210B exchanged between the vehicles 390 and the terrestrial content system 200B (including the staging server and storage system 200D). The off-aircraft communication controller and modem 340 similarly includes a Wi-Fi terminal wireless LAN unit (TWLU) 340A, configured as a wireless access bridge for processing the received broadband radio frequency communication signals 210B (e.g., viewing content 210) and communicating with the on-board file server 240.

The aircraft antenna 330 further includes a cellular modem antenna 330B configured for transmitting and/or receiving cellular communication signals 210A from the terminal cellular network 400C. The cellular modem antenna 330B can comprise any conventional type of cellular antenna systems for allowing two-way radio communication and suitable for installation on the passenger vehicle 390. The terminal cellular network 400C includes one or more cellular radio access networks, such as one or more terminal FemtoCell systems 430B and/or a PicoCell system (not shown) installed at an airport terminal, for communicating with the passenger vehicles 390. A terminal radio data link system 431B of the cellular access points 430B is configured to transmit and/or receive the cellular communication signals 210A exchanged between the passenger vehicles 390 and the terrestrial content system 200B (including the staging server and storage system 200D).

When the passenger vehicle 390 and the terrestrial content systems 200B, 200D are in communication, the load analysis/balance and control system 255 determines an appropriate distribution of network traffic (i.e., ground-based viewing content 210) over the terminal Wi-Fi network 300C and/or the terminal cellular network 400C. For example, this network traffic can include media load updates, media content, maintenance data, performance information, system usage, flight planning information (e.g., electronic flight bag data), operational information (e.g., FOQA, FDM, and so on), security updates, software content, and so on for loading onto and off-loading from the passenger vehicle 390. As described with reference to FIGS. 2A-B, the load analysis/balance and control system 255 distributes the network traffic based on, for example, current loads, projected loads, number of users, media type, device type, display resolutions, supported radio interfaces, available radio channels, streaming rates, size of media files, passenger viewing and browsing behavior, and so on. Furthermore, the load analysis/balance and control system 255 receives performance input (e.g., network interference measurements) from the terrestrial WAPs 310B to distribute the network traffic. In order to balance the network traffic loads across all available wireless networks, the network capacities of the Wi-Fi network 300C and the terminal cellular network 400C (i.e., via IP bypass system 425C and/or LIPA/SIPTO bypass system 425D) are considered. Accordingly, the information system 100 advantageously reroutes network packets (e.g., viewing content 210)—typically distributed over the Wi-Fi network 300C—through the cellular network 400C via IP bypass system 425C and/or LIPA/SIPTO bypass system 425D (i.e., without being routed through the operator core network 450).

As illustrated, each of the passenger vehicles 390 simultaneously can exchange viewing content 210 over any of the available terminal FemtoCell systems 430B. For example, the information system 100 can service both an aircraft 390C and an aircraft 390D by supplementing the Wi-Fi data link (e.g., via Wi-Fi network 300C) (a wireless connection between the aircraft and the gate commonly known as a gatelink) with a cellular data link (e.g., via cellular network 400C). Supplementing the conventional gatelink provides for a transmission of large files (e.g., viewing content 210) without incurring high service provider or roaming fees while reducing the load on the mobile operator core network 450. Furthermore, it is understood that cellular data links can be used at a greater range when the passenger vehicles 390 are in motion. Thereby, the cellular data link advantageously increases not only network bandwidth at the airport terminal, but also connection range when the aircraft is parked, taxiing, and/or approaching the terminal.

It is noted that the load analysis/balance and control system 255 is configured for distribution of viewing content 210 both throughout the vehicle 390 (as described with reference to FIGS. 2A-B) and between a terrestrial source and at least one of the vehicles 390 (as described with reference to FIGS. 3A-B) in one embodiment. Those with ordinary skill in the art can make modifications to the load analysis/balance and control system 255 within the scope of the present embodiments.

Figure 4A:
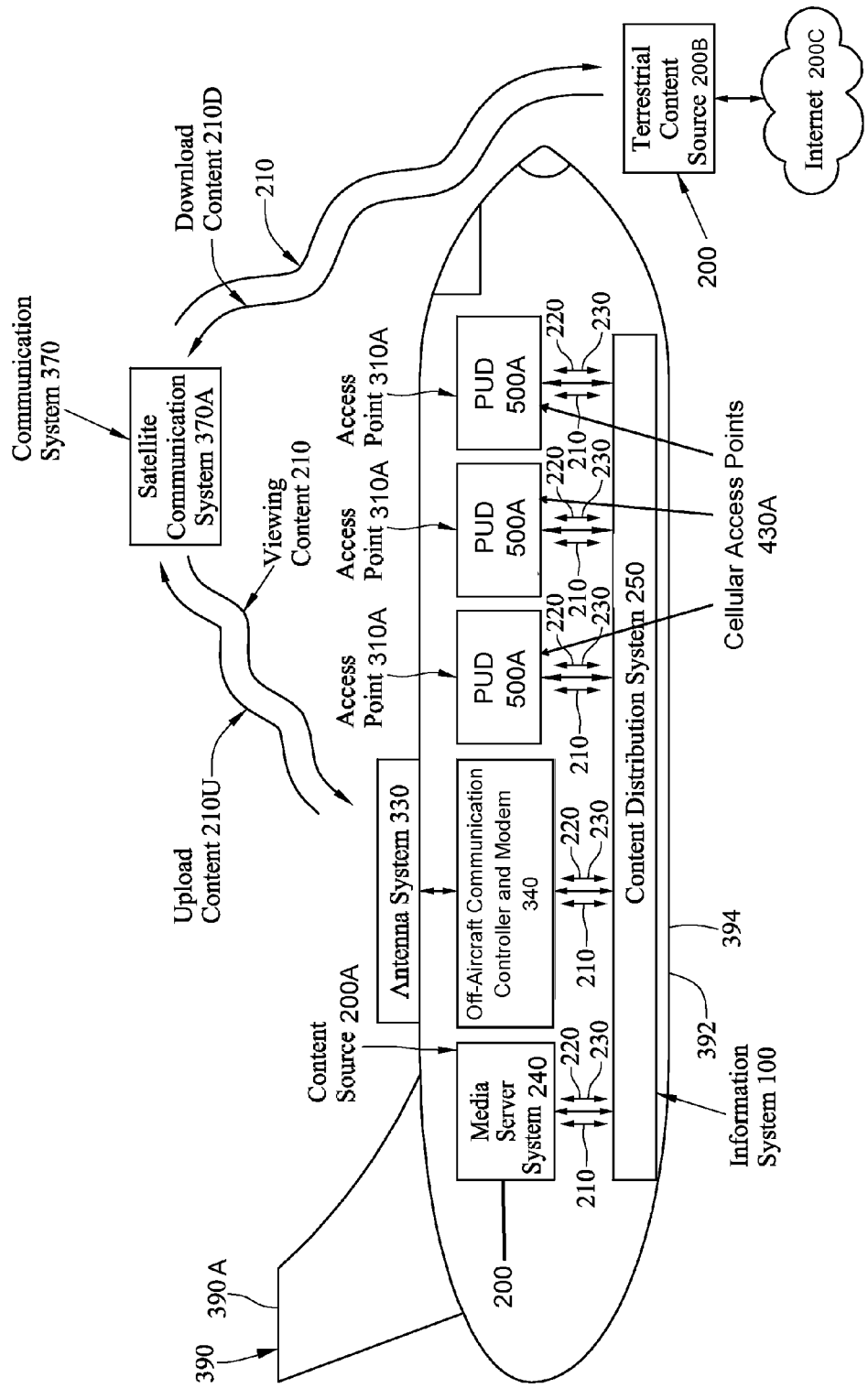
FIG. 4A is an exemplary top-level drawing illustrating the information system of FIG. 2, wherein the information system is installed aboard an aircraft.

In the manner discussed above with reference again to FIGS. 2A-B, the information system 100 can be configured for installation aboard a wide variety of passenger vehicles 390. Turning to FIGS. 4A-B, exemplary types of vehicles can include an aircraft 390A (shown in FIG. 4A), an automobile 390B (shown in FIG. 4B), a bus, a recreational vehicle, a boat, and/or a locomotive, or any other type of passenger vehicle without limitation. If installed on an aircraft 390A, as illustrated in FIG. 4A, for example, the information system 100 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

The antenna system 330 preferably is disposed outside the vehicle 390, such as an exterior surface 394 of a fuselage 392 of the aircraft 390B. Although shown and described as being separate systems for purposes of illustration, the off-aircraft communication controller and modem 340 and the media server system 240 can be at least partially integrated. Similarly, the transceiver system 340 may comprise separate components, such as a modem and a communication controller for receiving the viewing content from the remote (or terrestrial) content systems 200B. The off-aircraft communication controller and modem 340 distributes the viewing content 210 to the personal user devices 500A through the content distribution system 250 in the manner discussed above with reference to FIGS. 2A-B. In one embodiment, this distribution may occur during flight, approaching an airport terminal, taxiing near a gate, or parked at the terminal.

Figure 5:
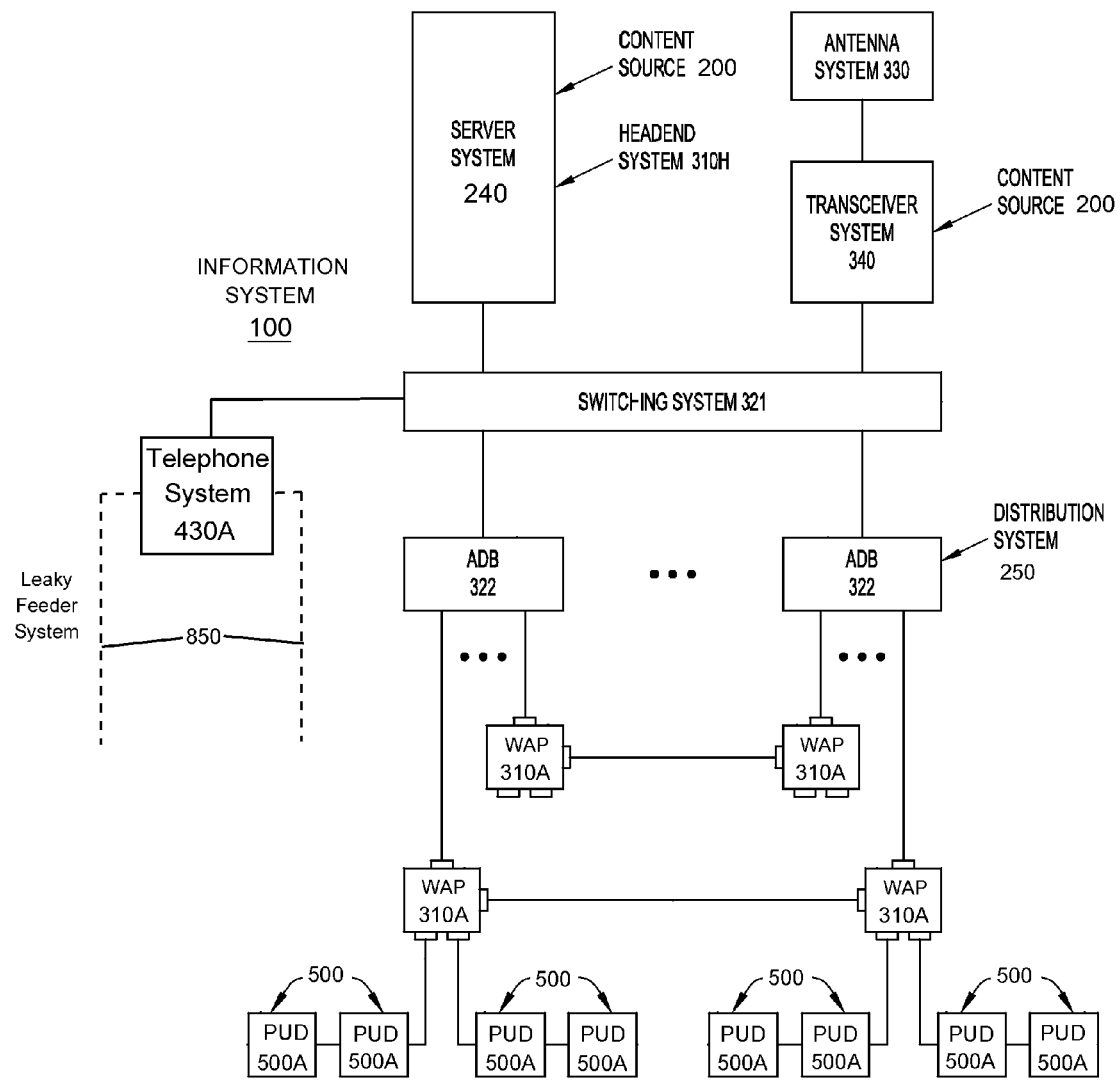
FIG. 5 is an exemplary detail drawing illustrating one embodiment of a distribution system for the information systems of FIGS. 4A-B.

The information system 100 components, including the content systems 200 and the personal user devices 500A, are shown in FIGS. 4A-B as communicating via the content distribution system 250. FIG. 5 illustrates an exemplary content distribution system 250 for the information system 100. The content distribution system 250 of FIG. 5 couples, and supports communication between a headend system 310H, which includes the content systems 200, and the personal user devices 500A. In one embodiment, the distribution system 250 as shown in FIG. 5 can be provided in the manner set forth in U.S. Pat. No. 7,675,849, entitled "SYSTEM AND METHOD FOR ROUTING COMMUNICATION SIGNALS VIA A DATA DISTRIBUTION NETWORK," and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties. Alternatively, and/or additionally, the distribution system 250 can be provided in the manner set forth in the co-pending U.S. patent application "OPTICAL COMMUNICATION SYSTEM AND METHOD FOR DISTRIBUTING CONTENT ABOARD A MOBILE PLATFORM DURING TRAVEL," Ser. No. 12/367,406, filed Feb. 6, 2009, which is assigned to the assignee of the present application and the disclosure of which is hereby incorporated herein by reference in its entirety.

As desired, the distribution system 250 likewise can include a network management system (not shown) provided in the manner set forth in co-pending U.S. patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 5, the distribution system 250 can be provided as a plurality of line replaceable units (LRUs), including area distribution boxes (ADBs) 322, a plurality of WAPs 310A, and the FemtoCell systems 430A being configured to communicate in real time via a plurality of wired and/or wireless communication connections. The line replaceable units of the distribution system 250 likewise can include a switching system 321 for providing an interface between the distribution system 250 and the headend system 310H. The switching system 321 can comprise a conventional switching system, such as an Ethernet switching system, and is configured to couple the headend system 310H with the area distribution boxes 322 and the cellular access points (e.g., FemtoCell systems 430A). Each of the area distribution boxes 322 and the cellular access points (e.g., FemtoCell systems 430A) are coupled with, and communicates with, the switching system 321. The leaky feeder systems 850, similar to the cellular antenna system 431A (shown in FIGS. 2A-B), are configured for exchanging cellular communication signals with the personal user devices 500A.

Each of the area distribution boxes 322, is also coupled with, and communicates with, at least one WAP 310A. Although the area distribution boxes 322 and the associated WAPs 310A can be coupled in any conventional configuration, the associated WAPs 310A preferably are disposed in a star network topology about a central area distribution box 322 as illustrated in FIG. 5. Each WAP 310A communicates with and services, a plurality of personal user devices 500A. Alternatively, the area distribution boxes 322 can be coupled with, and communicate with at least one floor disconnect box (not shown) that, in turn, communicates with at least one seat electronic box for supporting both wired and/or wireless communications in the manner set forth in co-pending U.S. patent application, entitled "SYSTEM AND METHOD FOR RECEIVING BROADCAST CONTENT ON A MOBILE PLATFORM DURING TRAVEL," Ser. No. 12/237,253, filed on Sep. 24, 2008, which is fully owned by the assignee of the present application and is hereby incorporated by reference in its entirety for all purposes.

Figure 6:
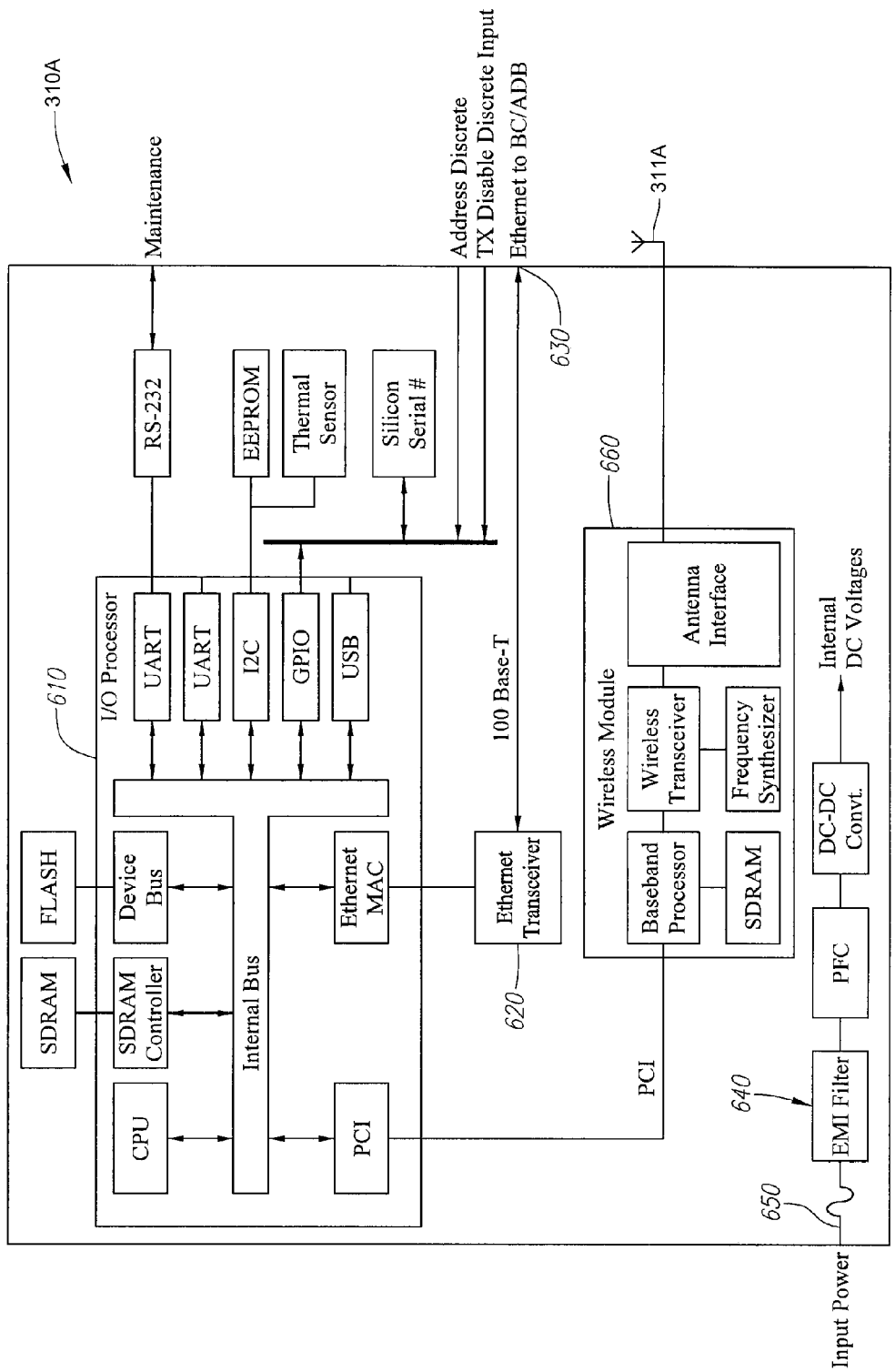
FIG. 6 is an exemplary detail drawing illustrating an embodiment of a wireless access point for the information system of FIGS. 1-5.

An exemplary wireless access point 310A for the information system 100 (shown in FIGS. 2, 4A-B, 5) is illustrated in FIG. 6. The wireless access point 310A is shown as including an input/output (I/O) processor system 610 that communicates with an Ethernet transceiver 620. The wireless access point 310A has a communication port 630 for exchanging Ethernet signals (not shown) with a broadband control system 514 (shown in FIG. 7) and/or a selected ADB 322 (shown in FIG. 5) of the information system 100. The input/output (I/O) processor system 610 likewise can communicate with a wireless module system 660. The wireless module system 660 is coupled with the access point antenna system 311A (likewise, can be coupled with the access point antenna system 311B of FIGS. 3A-B) and enables the access point antenna system 311A to transmit and/or receive broadband radio frequency communication signals (e.g., viewing content 210B shown in FIGS. 2A-B) between the information system 100 and the personal user devices 500A (shown in FIGS. 2, 4A-B, 5). As shown in FIG. 6, the wireless access point 310A includes a power supply system 640 that receives incoming power from the ADB 322 and that provides operating power for the wireless access point 310A.

In operation, the information system 100 advantageously can support bidirectional data transfers at significant data rates. For example, the information system 100 can support (forward link) data downloads with data rates of up to approximately 10 Mbps-15 Mbps or higher and (return link) data uploads with data rates of up to approximately 1.5 Mbps or higher. The bandwidth used by a typical passenger (or user) during eight hours of travel can be about 7 Mbps. As set forth above, the information system 100 can permit access to the Internet 200C in any conventional manner, including via the personal media device 500A (shown in FIGS. 2, 4-5) that communicates with the information system 100 via a wired and/or wireless access points 310A (shown in FIGS. 2A-B) and/or the cellular access points (e.g., FemtoCell systems 430A) of the information system 100. As desired, the personal user device 500A can comprise a stand-alone installation such that the personal user device 500A operates as an independent passenger data network via the access points 310A and/or the cellular access points/radio access networks (e.g., FemtoCell systems 430A, base transceiver stations (BTS), HNBs, and HeNBs). Connectivity preferably is accomplished via the personal user device 500A.

When installed aboard an aircraft 390A, for example, the information system 100 preferably presents a broadband portal application that provides users (or passengers) with onboard access to a premier set of in-flight Intranet and Internet, information, entertainment, communications, and/or other system services during travel. Selected system services may be provided at no cost to the user (or passenger); whereas, other selected system services may require payment of a fee before access to the system services is permitted. The system services can include access to websites on the World Wide Web via the onboard intranet. Thereby, the user can have direct access to virtually any site on the Internet 200C. Access to selected sites, such as web sites that present obscene or otherwise objectionable material, may be limited during travel. Stated somewhat differently the information system 100 can provide website filtering/blocking of objectionable content, unauthorized site and services which require excess bandwidth. The user likewise can send and/or receive electronic mail (or email) message by directly accessing their business and/or personal email accounts. As desired, an authorized user can establish a connection to a virtual private network (VPN). The user can access instant messaging (IM) and/or Short Message Service (SMS).

As previously discussed, the user can access viewing content 210 stored by the information system 100. The stored viewing content 210 can include premium viewing content 210, such as selected television programming, movies, and/or short films. Electronic magazines (e-zines), newspapers and other publications likewise can be provided as the viewing content 210. The information system 100 preferably provides a standard selection of publications and/or publications that are specifically selected to appeal to user demographics. As desired, the viewing content 210 can be selected and/or manipulated to increase font size and reviewed while on the aircraft 390A. Electronic publications may be removed from the aircraft 390A if purchased.

Additionally, and/or alternatively, the user can access onboard games and/or view advertising, news, weather, sports financial, and/or other types of viewing content 210. The viewing content 210 can be selected, for example, based upon the user's interests and/or the region of travel. The advertising content can include Web advertising content. The user likewise can access airline information content, which can includes maps, connecting gate information, arrival/departure information, and/or destination information based on airline preference. The information system 100 can offer viewing content 210 provided via one or more channels of Internet Protocol Television (IPTV) programming and/or Internet Protocol (IP) Radio programming. The IPTV programming can include live programming that is focused on news and sports. Other types of IPTV programming may be delivered over the broadband link but not in a real-time fashion and usually during non-peak network demand periods.

As set forth above, selected system services of the information system 100 may require payment of a fee before access to the system services is permitted. Exemplary fee-based system services can include pay-per-use services and/or in-flight shopping. The pay-per-use services can include specialty system services, such as streaming audio, streaming video, IPTV programming, and system services that utilize the broadband telecommunications link with the terrestrial content system 200B. Exemplary system services that utilize the broadband telecommunications link include instant messaging (IM), Short Message Service (SMS), restaurant reservations, tee times, online bookings, and and/or access to games. The fee for these system services can vary based on the particular feature accessed. The information system 100 likewise can provide computer games and/or multi-player games, which can be charged on an unlimited play of a title basis and/or unlimited play of games from the same distributor.

In-flight shopping advantageously permits a user (or Web shopper) to make purchases by browsing a selected Web site, selecting an item registering on the site, providing a credit card number and shipping information. The sales information can be transmitted to the Web vendor who, upon verifying the credit card information, ships the purchased item. The preferably receives a confirmation number. As desired, the graphic content of e-commerce web sites can be re-hosted and stored on the server system 240 (shown in FIGS. 2A-B). Airborne viewing content 210 can be synchronized with the ground-based viewing content 210 and provide regular updates for pricing, product, etc., in the manner set forth with reference to FIGS. 3A-B and/or any other conventional loading/off-loading method. Preferably, the information system 100 can select appropriate e-commerce partners to match user demographics and preferences regarding markets and services.

If he elects to make a purchase while browsing the selected. Web site, the users can provide purchase authorization information, such as credit card verification information, to confirm that the user is authorized to make the purchase. As desired, the information system 100 can include a card reader (not shown) for reading purchase authorization information provided by various types of cards, such as credit cards, frequent flyer cards, and the like. The information system 100 can authenticate the purchase authorization information in real time to avoid transaction processing delays and potential fraud. As needed, the information system 100 can cache the purchase authorization information while the satellite link is not available. The purchase authorization information thereby can be transmitted once the satellite link becomes available in the manner discussed with reference to FIGS. 3A-B. The information system 100 preferably provides purchase confirmation information, such as a confirmation number, upon verifying the purchase authorization information.

Returning to FIGS. 4A-B, the personal user devices 500A are provided for selecting viewing content 210 and for presenting the selected viewing content 210. When the personal user devices 500A and the information system 100 are in communication, the information system 100 can perform a plurality of integration tasks simultaneously, enabling the personal user device 500A to become fully integrated with the information system 100 via a selected access point 310A or a selected cellular access point/radio access network (e.g., FemtoCell system 430A, BTS, HNB, and HeNB). The system components of the information system 100 and the personal user device 500A thereby become interchangeable. The personal user device 500A likewise can receive control signals (or commands) 220 and/or operating power from the information system 100. For example, user instructions 230 for controlling the operation of the information system 100 can be provided via the personal user device 500A. In other words, the personal user device 500A can be used to select viewing content 210 and control the manner in which the selected viewing content 210 is received and/or presented. Thereby, the personal user device 500A advantageously can become a seamless part of the information system 100. As desired, the personal user devices 500A can comprise conventional passenger interfaces and can be provided in the manner set forth in the above-referenced U.S. Pat. No. 7,945, 934, entitled "PORTABLE MEDIA DEVICE AND METHOD FOR PRESENTING VIEWING CONTENT DURING TRAVEL," as well as in the manner set forth in the co-pending U.S. patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety.

Figure 7:
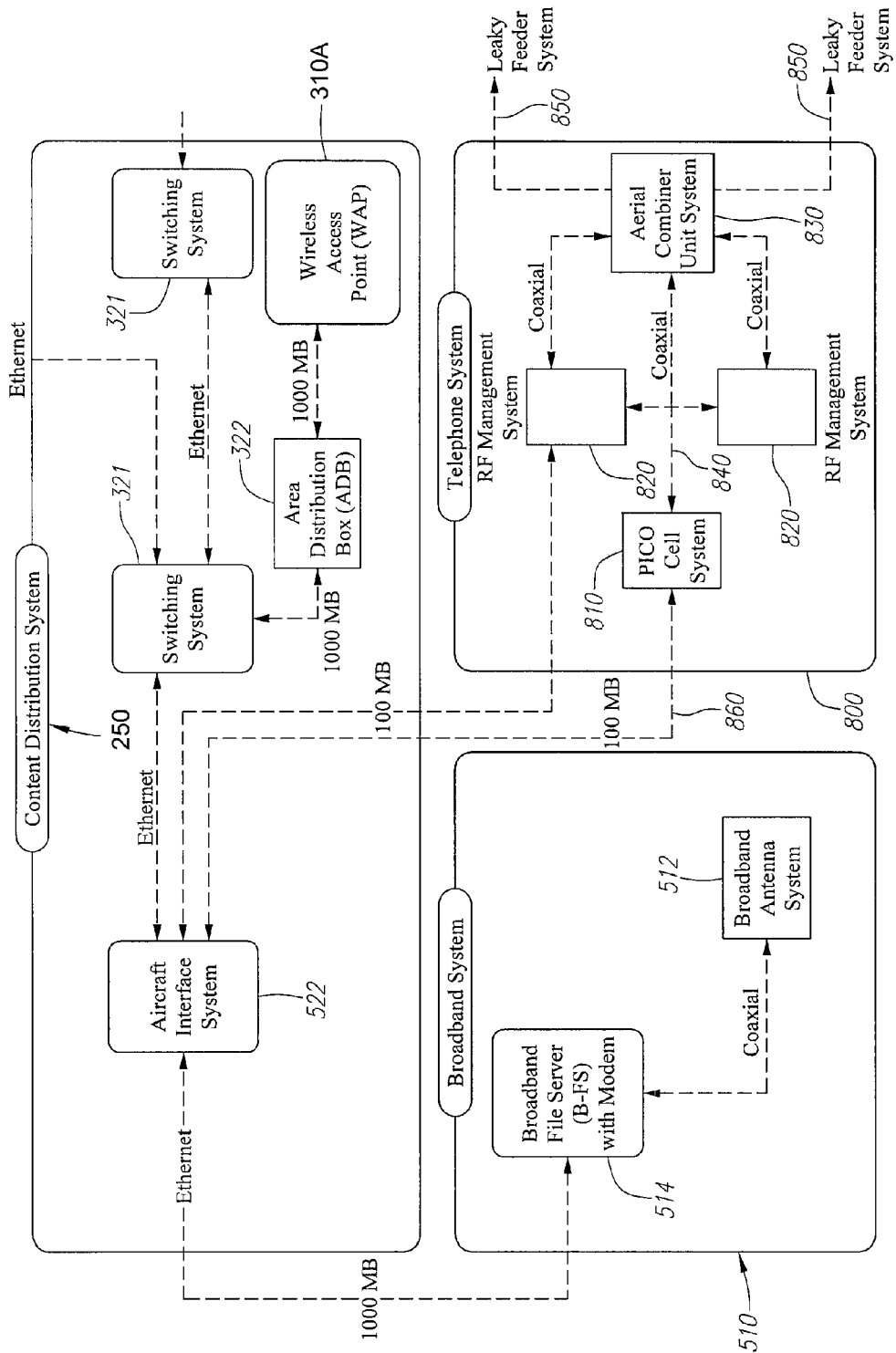
FIG. 7 is an exemplary detail drawing illustrating an alternative embodiment of the information system of FIGS. 4A-B, wherein the information system includes a telephone system.

When used on-board a passenger vehicle, another selected embodiment of the information system 100 is shown and described with reference to FIG. 7. Turning to FIG. 7, the information system 100 is shown as including a telephone system 800. Like the cellular access points (shown in FIGS. 2, 4A-B), the telephone system 800 can be provided as a FemtoCell telephone system 420A (shown in FIGS. 2A-B), a PicoCell telephone system 810 and/or can support mobile telephone connectivity within the passenger vehicle 390 (shown in FIGS. 4A-B). The information system 100 thereby enables users (or passengers) to operate their personal user devices 500A that support cellular communication connections while traveling aboard the passenger vehicle 390. By integrating the telephone system 800 for on-board systems, the information system 100 advantageously can not only provide robust cellular telephone service that has greater simultaneous calling capacity and that has lower per minute cost than conventional cellular telephone systems, but also increase the total capacity for content distribution by making use the available allocated or spare capacity over of both the telephone system 800 and that provided by WAPs 310A.

As shown in FIG. 7, the PicoCell system 810 communicates with one or more radio frequency (RF) management systems 820 and/or aerial combiner unit (ACU) systems 830. The PicoCell system 810, the radio frequency (RF) management systems 820, and the aerial combiner unit systems 830 are shown as communicating via coaxial communication connections 840. Each aerial combiner unit system 830 provides the at least one leaky feeder system 850 in the manner discussed with reference to FIG. 5. The PicoCell system 810 and/or at least one of the radio frequency management systems 820 can communicate with the aircraft interface system 522 via a high-speed 10/100/1000 Base-SX/T Ethernet communication connection 860.

The telephone system 800 preferably receives the cellular communication signals and converts the cellular communication signals into a Voice-over-Internet-Protocol (VoIP) format for transmission to the content system 200 (shown in FIG. 1A) via a broadband communication system 510 and the satellite communication system 370A (shown in FIGS. 2A-B). Incoming VoIP signals can be converted by the telephone system 800 into cellular communication signals that are transmitted to the personal user devices 500A. The information system 100 thereby can maximize content distribution channels by exploiting a predetermined number of cellular telephone channels for cabin internal seat-to-seat communication and/or for air-to-ground communication.

The broadband communication system 510 is illustrated as including a broadband antenna system 512 and the broadband control system 514. Preferably being disposed under, and protected by, a radome, the broadband antenna system 512 can be provided in the manner set forth above with reference to the antenna system 330 (shown in FIGS. 2-4) and operates under control of the broadband control system 514. Exemplary antenna systems and control systems are shown and described in set forth in the above-referenced co-pending U.S. patent application, entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. An exemplary broadband antenna system is the MiJet broadband antenna system formerly manufactured by Starling Advanced Communications Ltd., of Yoqneam, Israel in which Starling has since been acquired by Panasonic Avionics Corporation of Lake Forest, Calif., USA and now manufactures the foregoing broadband antenna system. The information system 100 thereby can support a broadband network load of approximately 18 Mbits/s for downstream traffic and 4.2 Mbits/s for upstream traffic.

The broadband control system 514 can include a conventional satellite modem system (not shown) and/or a media server system that is provided in the manner set forth above with reference to the media server system 240 (shown in FIGS. 2A-B).

As previously discussed, the load analysis/balance and control system 255 distributes the network traffic based on, for example, current loads, projected loads, number of users, media type, device type, display resolutions, supported radio interfaces, available radio channels, streaming rates, size of media files, passenger viewing and browsing behavior, and so on. Turning to FIGS. 8A-E, various distribution methods are illustrated. For example, with reference to FIG. 8A, the load analysis/balance and control system 255 receives a content request device classification. After checking the request type, the load analysis/balance and control system 255 checks the cumulative network traffic over both the first network 300 (e.g., Wi-Fi network 300B shown in FIG. 2A) and the second network 400 (e.g., cellular network 400B as shown in FIG. 2A). In this example, a predefined congestion rate of 85% occupancy is used. Stated in another way, the load analysis/balance and control system 255 selects the Wi-Fi network 300B for distribution if the cellular network 400B is using 85% of its available bandwidth. Similarly, the cellular network 400B is selected if the Wi-Fi network 300B is using 85% of its bandwidth.

Figure 8A:
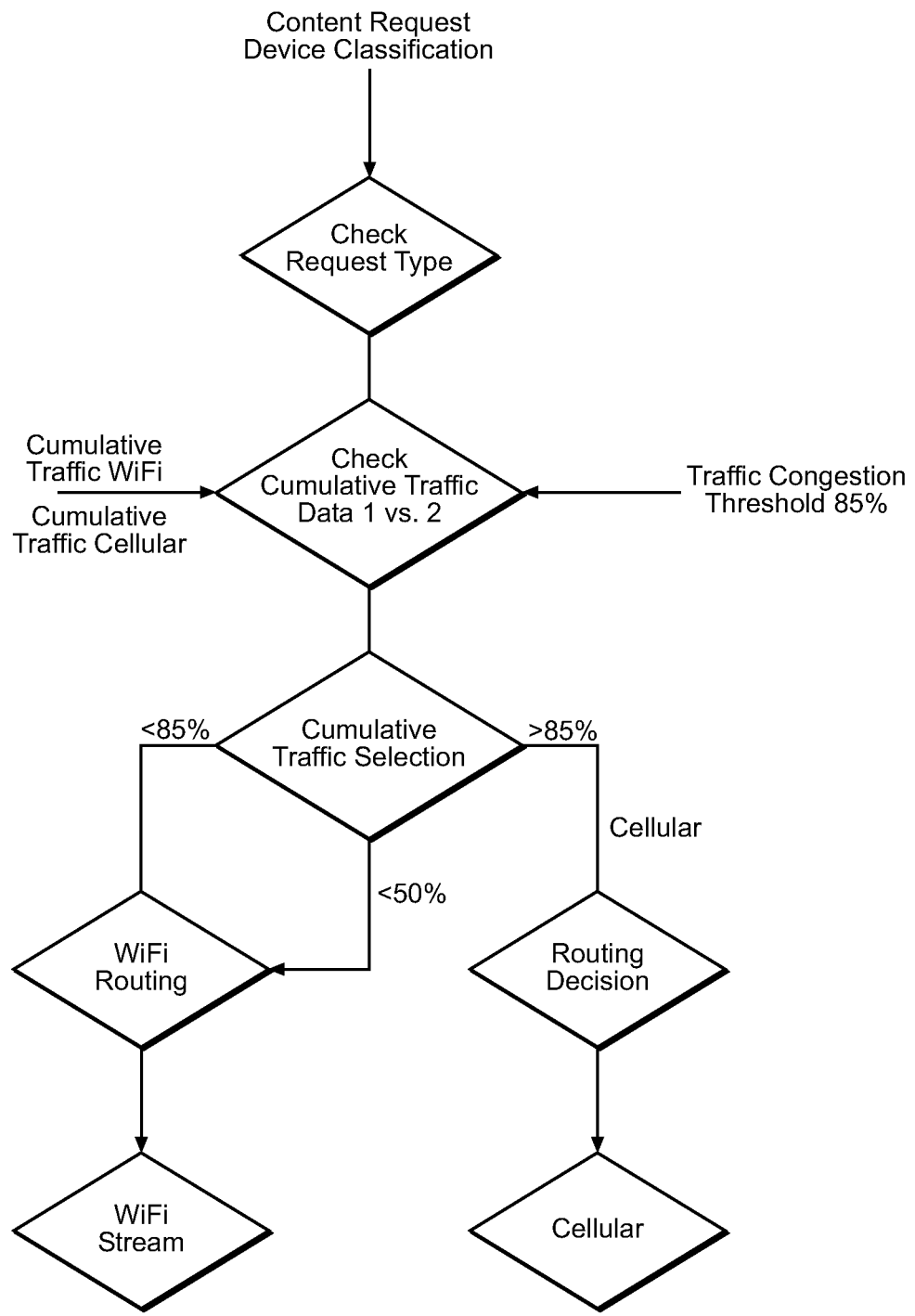
FIGS. 8A-E are exemplary flow charts illustrating various embodiments of a method by which the information system of FIGS. 1-3 dynamically routes content over the first network and the second network.
Figure 8B:
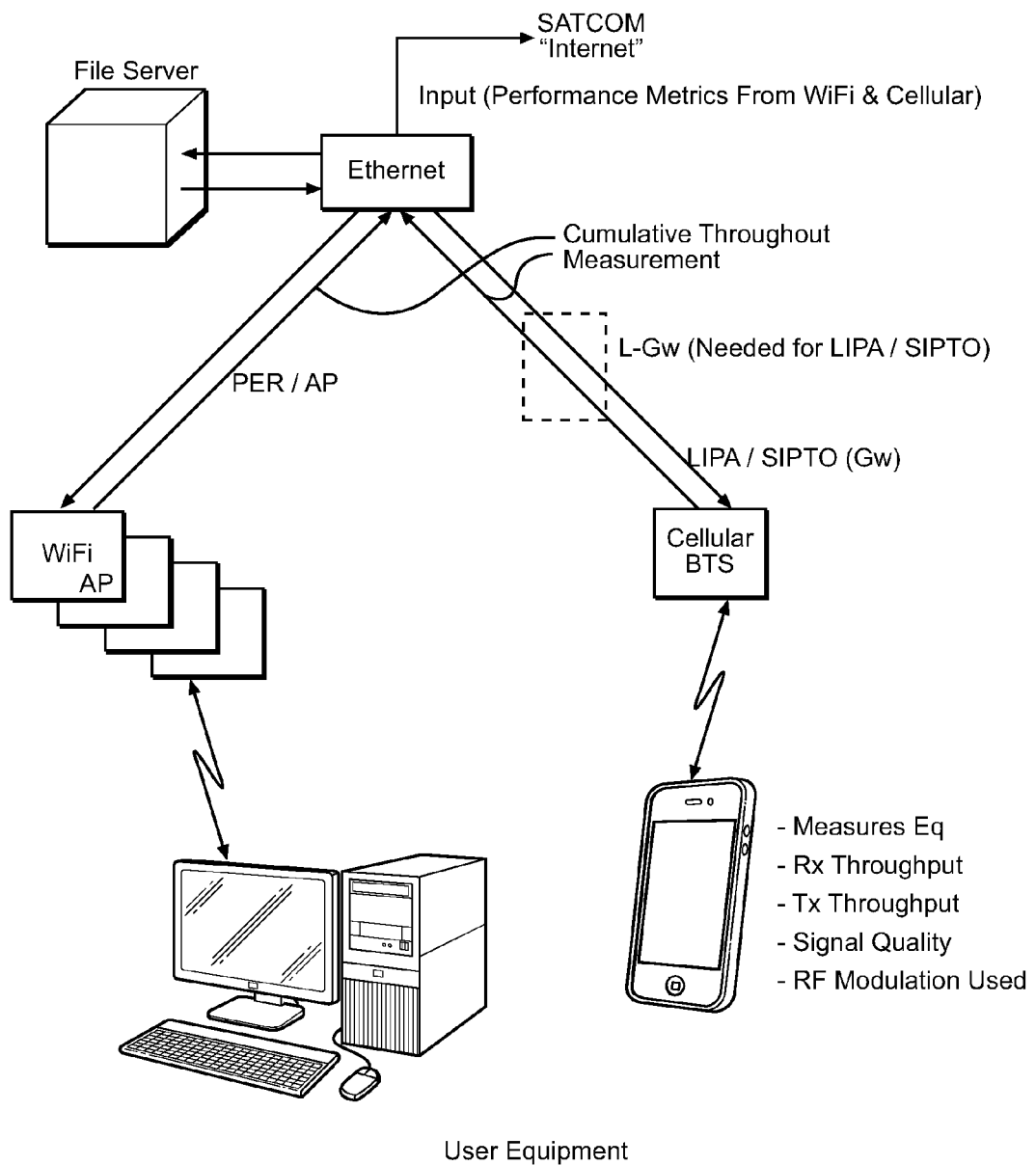
Figure 8C:
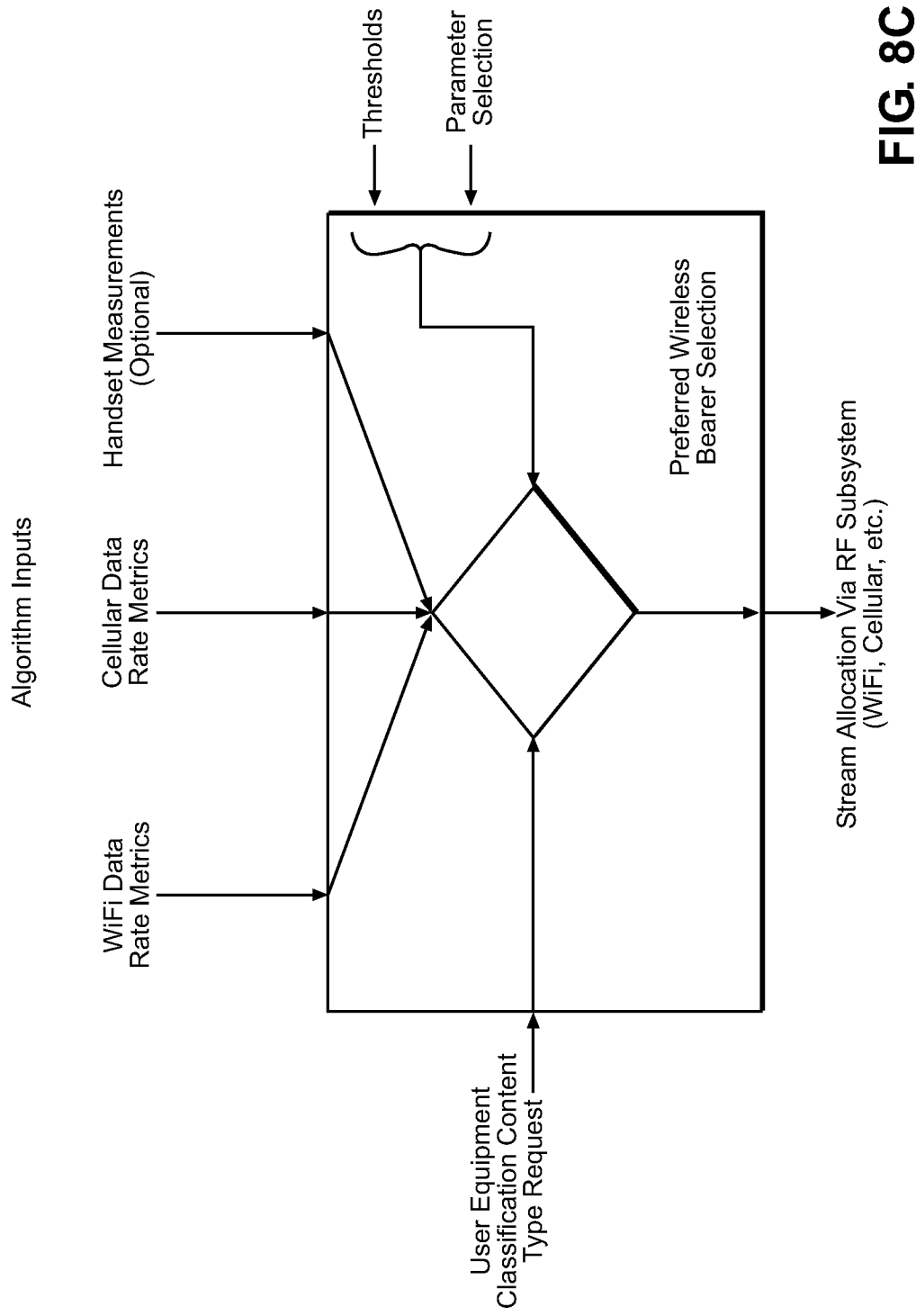

In another example illustrated in FIG. 8B, the load analysis/balance and control system 255 measures both performance metrics of the wireless networks (e.g., Wi-Fi network 300B and cellular network 400B) and performance metrics (e.g., transmission/reception throughput, signal quality, RF modulation, and so on) of the content transceiver system 500 to select the optimal wireless network. FIG. 8C illustrates measuring performance metrics of both the networks 300 and 400 and the content transceiver system 500 in addition to selecting the network based on predefined conditions (e.g., thresholds and parameter selections).

Figure 8D:
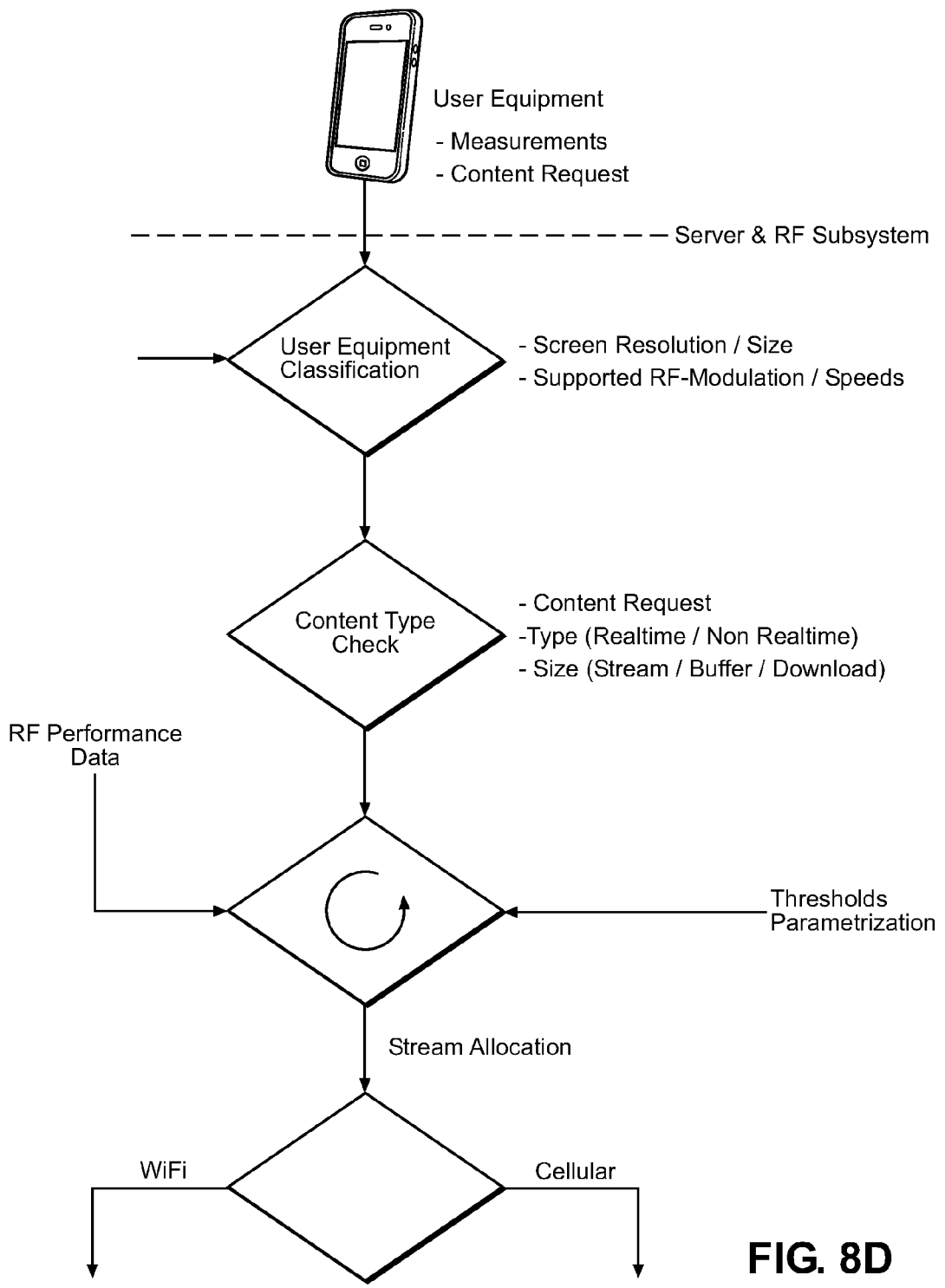
Figure 8E:
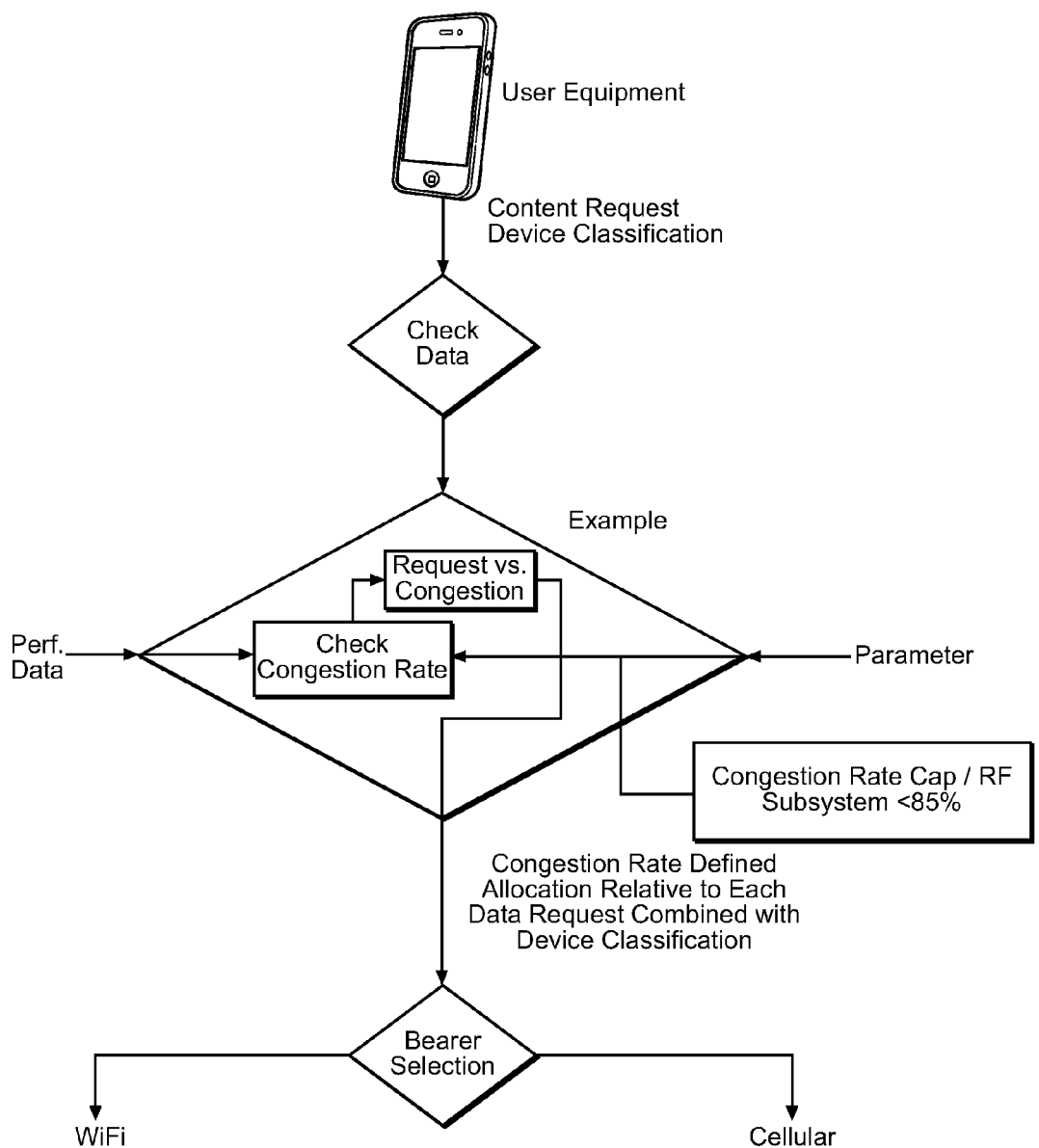

In yet another example illustrated in FIGS. 8D-E, specific parameters are considered including, but not limited to, RF performance, classification of the content transceiver system 500, content type (e.g., real-time, non real-time, and so on), content size (e.g., stream, buffer, download), and congestion rate.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A system for distributing content among a plurality of handheld devices, comprising:
   a first communication connection in communication with a first wireless network for distributing the content;
   a second communication connection in communication with a second wireless network that includes an operator core network; and
   an IP broadband bypass system being in communication with the first and the second communication connection for simultaneously distributing selected content to the plurality of handheld devices using both of the first and second wireless networks, except if at least one of the first and second wireless network is using at least eight-five percent of its available bandwidth, then:
     if the first wireless network is using at least eight-five percent of its available bandwidth, the second wireless network is selected to distribute the selected content, and
     if the second wireless network is using at least eight-five percent of its available bandwidth, the first wireless network is selected to distribute the selected content,
   wherein said IP broadband bypass system distributes the selected content over the second wireless network without the selected content being routed through the operator core network.

2. The system of claim 1, wherein the IP broadband bypass system includes a Local Internet Protocol Access (LIPA) and Selected Internet Protocol Traffic Offload (SIPTO) bypass system.

3. The system of claim 1, wherein the first wireless network is a wireless fidelity (Wi-Fi) network, and wherein the second wireless network is a cellular network.

4. The system of claim 3, wherein the cellular network is selected from a group consisting of a Global System for Mobile Communications (GSM) network, a third-generation (3G) mobile phone network, and a fourth-generation (4G) mobile phone network.

5. The system of claim 3, wherein said second communication connection includes at least one of a PicoCell system and a FemtoCell system.

6. The system of claim 1, wherein the selected content is selected from a viewing content group consisting of content associated with in-transit shopping, the Internet, entertainment media, electronic mail, corporate virtual private networks, customer virtual private networks, streamed media, and an Intranet system.

7. The system of claim 1, further comprising a local content system, wherein the plurality of handheld devices can select and present content available from the local content system.

8. The system of claim 1, further comprising a remote content system, wherein content available from the remote content system can be distributed throughout the plurality of handheld devices via a satellite communication system.

9. The system of claim 8, wherein the plurality of handheld devices are configured to receive the content streamed from the remote content system.

10. The system of claim 1, wherein each of the first communication connection and the second communication connection are configured for authenticating the plurality of handheld devices.

11. The system of claim 10, wherein the first communication connection and the second communication connection are configured for authenticating based on Extensible Authentication Protocol (EAP) methods.

12. The system of claim 1, wherein said IP broadband bypass system selects at least one of the first and second wireless network for distributing the selected content to the plurality of handheld devices based on loading factors selected from the group consisting of current loads, projected loads, number of users, media type, type of the handheld devices, display resolutions, supported radio interfaces, available radio channels, streaming rates, size of media files, passenger viewing behavior, and passenger browsing behavior.

13. The system of claim 1, wherein the system is configured for installation aboard a passenger vehicle.

14. The system of claim 13, wherein the passenger vehicle comprises an aircraft.

15. A method for distributing content among a plurality of passenger vehicles, comprising:
   establishing a first communication connection with a first wireless network;
   establishing a second communication connection with a second wireless network that includes an operator core network;
   simultaneously distributing selected content to the plurality of passenger vehicles over both of the first and second wireless networks via an IP bypass system, except if at least one of the first and second wireless network is using at least eight-five percent of its available bandwidth, then:
      if the first wireless network is using at least eight-five percent of its available bandwidth, simultaneously distributing the selected content over the second wireless network, and
      if the second wireless network is using at least eight-five percent of its available bandwidth, simultaneously distributing the selected content over the first wireless network,
   wherein said distribution over the second wireless network bypasses the operator core network.

16. The method of claim 15, wherein the first wireless network is a wireless fidelity (Wi-Fi) network, and wherein the second wireless network is a cellular network.

17. The method of claim 15, wherein said simultaneously distributing comprises optimizing a total network bandwidth of both of the first and second wireless networks based on one or more loading factors.

18. The method of claim 17, wherein said one or more loading factors is selected from a group consisting of current loads, projected loads, number of users, media type, size of media files, passenger viewing behavior, and passenger browsing behavior.

19. The method of claim 15, wherein the selected content is selected from a viewing content group consisting of content associated with media, content, data files, maintenance information, performance information, system usage information, flight planning information, flight operational quality assurance (FOQA), flight data monitoring (FDM) information, calling content, text messaging, electronic mail (e-mail), television programming content, music content, podcast content, photograph album content, audiobook content, movie content, and game content.

20. A system for distributing content among a plurality of passenger vehicles, comprising:
   a first communication connection in communication with a first wireless network for distributing the content;
   a second communication connection in communication with a second wireless network that includes an operator core network; and
   an IP broadband bypass system being in communication with the first and the second communication connection for simultaneously distributing selected content to the plurality of passenger vehicles using both of the first and second wireless networks, except if at least one of the first and second wireless network is using at least eight-five percent of its available bandwidth, then:
      if the first wireless network is using at least eight-five percent of its available bandwidth, the second wireless network is selected to distribute the selected content, and
      if the second wireless network is using at least eight-five percent of its available bandwidth, the first wireless network is selected to distribute the selected content,
   wherein said IP broadband bypass system distributes the selected content over the second wireless network without the selected content being routed through the operator core network.

21. The system of claim 20, wherein the first wireless network is a wireless fidelity (Wi-Fi) network, and wherein the second wireless network is a cellular network.

22. The system of claim 20, wherein said IP broadband bypass system includes a LIPA and SIPTO bypass system.

* * * * *